(12) United States Patent
Adler et al.

(10) Patent No.: US 6,315,265 B1
(45) Date of Patent: Nov. 13, 2001

(54) VARIABLE VALVE TIMING ACTUATOR

(75) Inventors: Scott Peter Adler, Waunakee; Norman Henry Beachley, Verona; Frank John Fronczak; Ahmad Mohammad Sabri, both of Madison, all of WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/548,635

(22) Filed: Apr. 13, 2000

Related U.S. Application Data
(60) Provisional application No. 60/129,256, filed on Apr. 14, 1999.

(51) Int. Cl.[7] .............................. F16K 31/122; F01L 9/02
(52) U.S. Cl. ......................... 251/28; 251/32; 123/90.12
(58) Field of Search ................................. 251/28, 32, 49, 251/48; 123/90.12

(56) References Cited

U.S. PATENT DOCUMENTS

| | | |
|---|---|---|
| 3,926,159 | 12/1975 | Micheslon et al. . |
| 4,244,553 | 1/1981 | Escobosa . |
| 4,245,813 * | 1/1981 | Grenier .................................. 251/32 |
| 4,942,852 | 7/1990 | Richeson et al. . |
| 5,058,538 | 10/1991 | Erickson et al. . |
| 5,109,812 | 5/1992 | Erickson et al. . |
| 5,125,371 | 6/1992 | Erickson et al. . |
| 5,152,260 | 10/1992 | Erickson et al. . |
| 5,221,072 | 6/1993 | Erickson et al. . |
| 5,253,619 | 10/1993 | Richeson et al. . |
| 5,259,345 * | 11/1993 | Richeson .......................... 123/90.12 |
| 5,275,136 | 1/1994 | Schechter et al. . |
| 5,327,858 | 7/1994 | Hausknecht . |
| 5,529,030 | 6/1996 | Rose . |
| 5,638,781 | 6/1997 | Sturman . |
| 5,713,316 | 2/1998 | Sturman . |
| 5,809,950 * | 9/1998 | Letsche et al. ................... 123/90.12 |

OTHER PUBLICATIONS

Ahmad, T. and Theobald, M.A., A Survey of Variable-Valve-Actuation Technology, 1989 Society of Automotive Engineers, Inc. #891674, pp. 1–27.

Chapter 11, Clutches and Brakes, Commercially Available One-Way Clutches, pp. 684–686.

(List continued on next page.)

*Primary Examiner*—Kevin Lee
(74) *Attorney, Agent, or Firm*—Craig A. Fieschko, Esq.; DeWitt Ross & Stevens S.C.

(57) ABSTRACT

The invention involves a variable valve timing actuator that allows the opening and closing of engine valves to be variably and individually controlled without using a camshaft. The invention utilizes energy regeneration so energy delivered to a valve while accelerating it is recovered while it is decelerating. Regeneration is preferably provided by potential energy storage devices such as springs. Energy losses are made up by adding energy to the actuator while the valve is stationary (or nearly so) in an open or closed state. This is done by (1) moving the spring seats in relation to the valve, thereby "charging" the springs in relation to the valve, and/or by (2) moving the valve with respect to the spring seats to "charge" the springs with respect to the valve. This energy addition is extremely efficient because it is performed after the potential energy within the springs has already been expended and the valve is sitting stationary in its open and closed positions. To hold the valve stationary when desired, a latch (e.g., a one-way clutch) is used to releasably fix the valve in place.

21 Claims, 17 Drawing Sheets

OTHER PUBLICATIONS

Dresner, Thomas and Barkan, Philip, A Review and Classification of Variable Valve Timing Mechanisms, 1989 Society of Automotive Engineers, Inc. #890674, pp. 1–14.

Dresner, Thomas and Barkan, Philip, A Review of Variable Valve Timing Benefits and Modes of Operation, 1989 Society of Automotive Engineers, Inc. #891676, pp. 1–9.

Gray, C., A Review of Variable Engine Valve Timing, 1988 Society of Automotive Engineers, Inc., #880386, pp. 1–11.

Schecter, Michael M. and Levin, Michael B., Camless Engines, 1996 Society of Automotive Engineers, Inc. #960581, pp. 17–31.

Stone, Richard and Kwan, Eric, Variable Valve Actuation Mechanisms and the Potential for their Application, 1989 Society of Automotive Engineers, Inc. #890673, pp. 1–17.

Van Valkenburgh, Paul, Electric Valves, Road & Track, pp. 170 and 174.

* cited by examiner

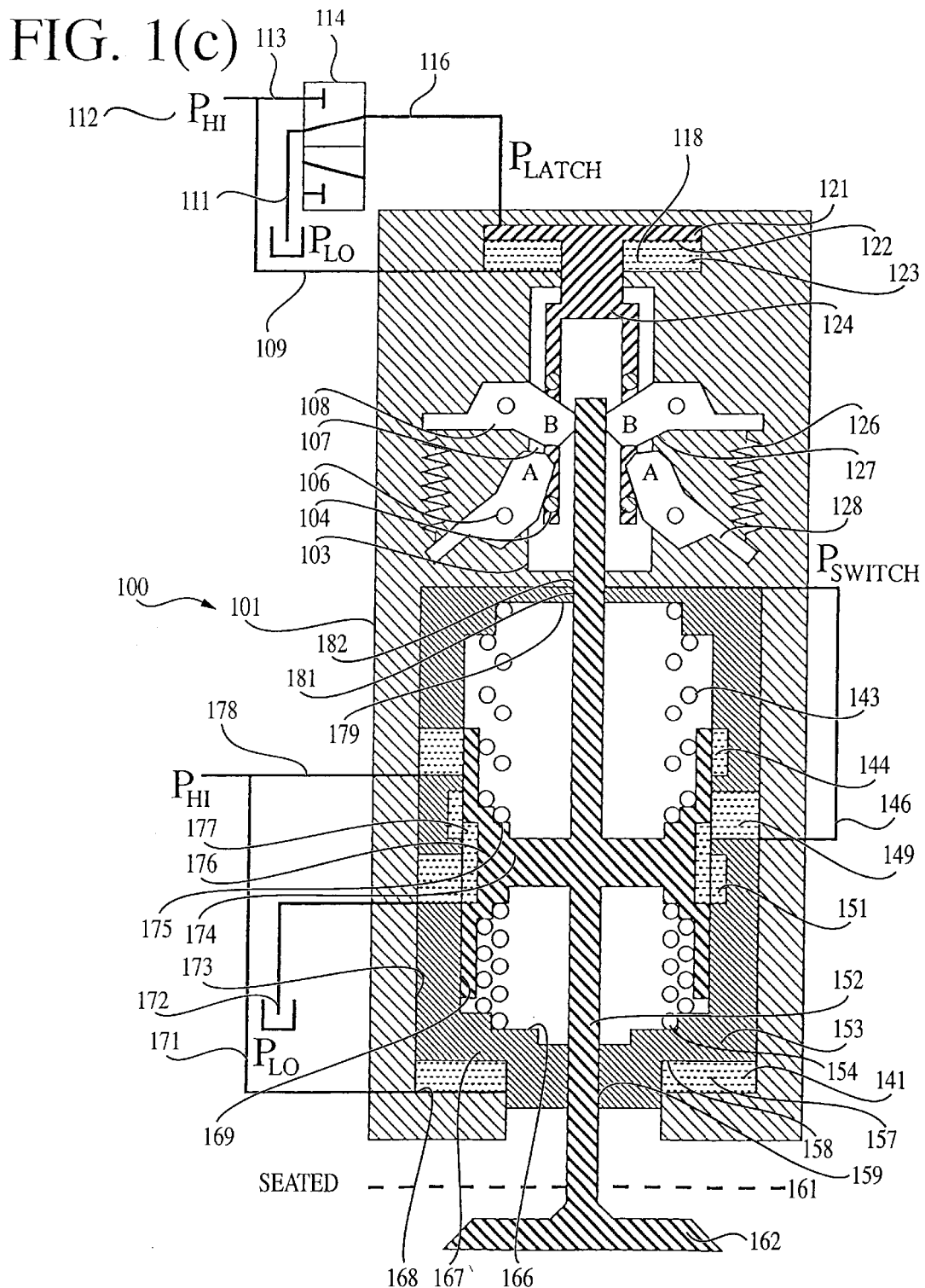

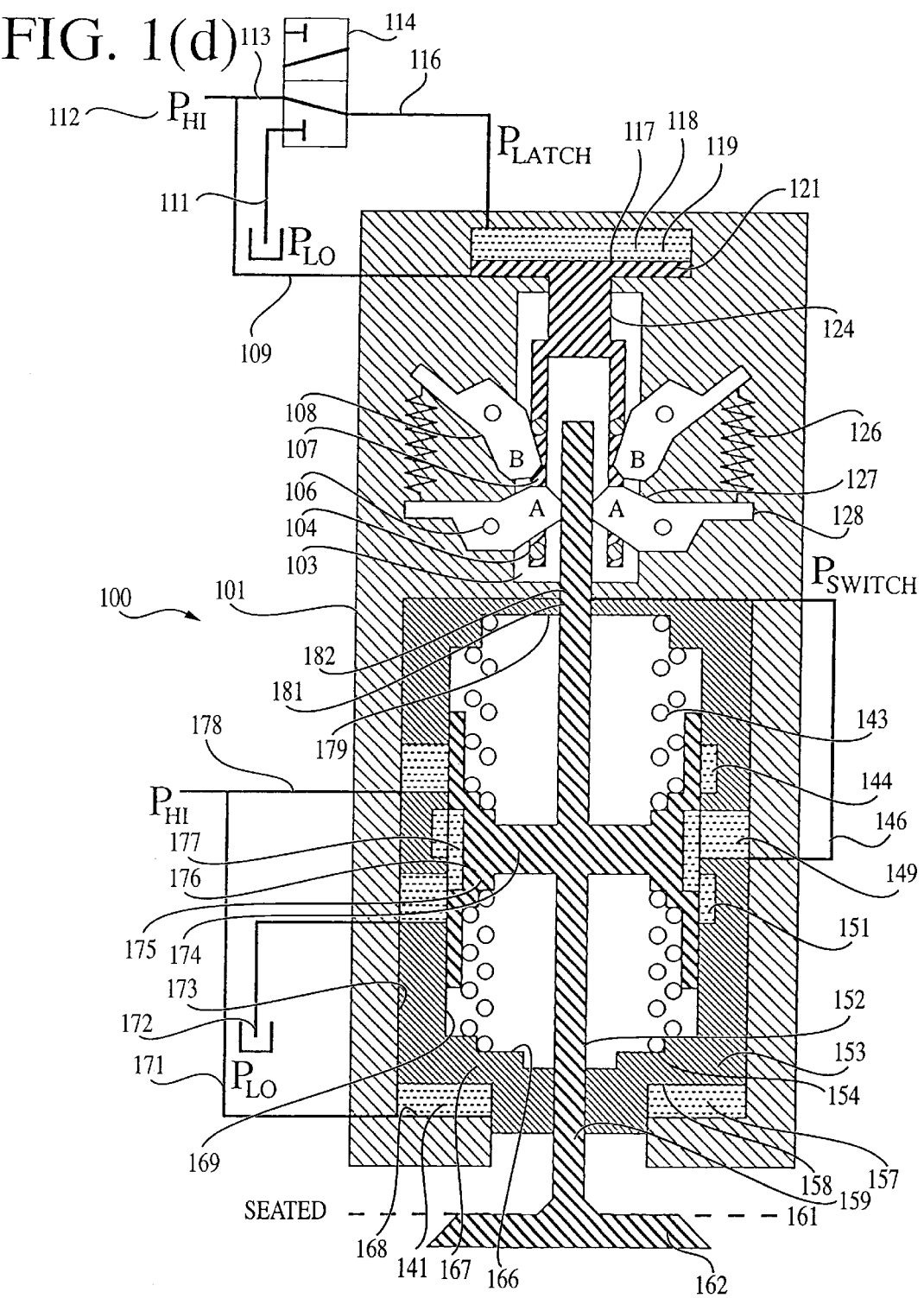

FIG. 2(a)

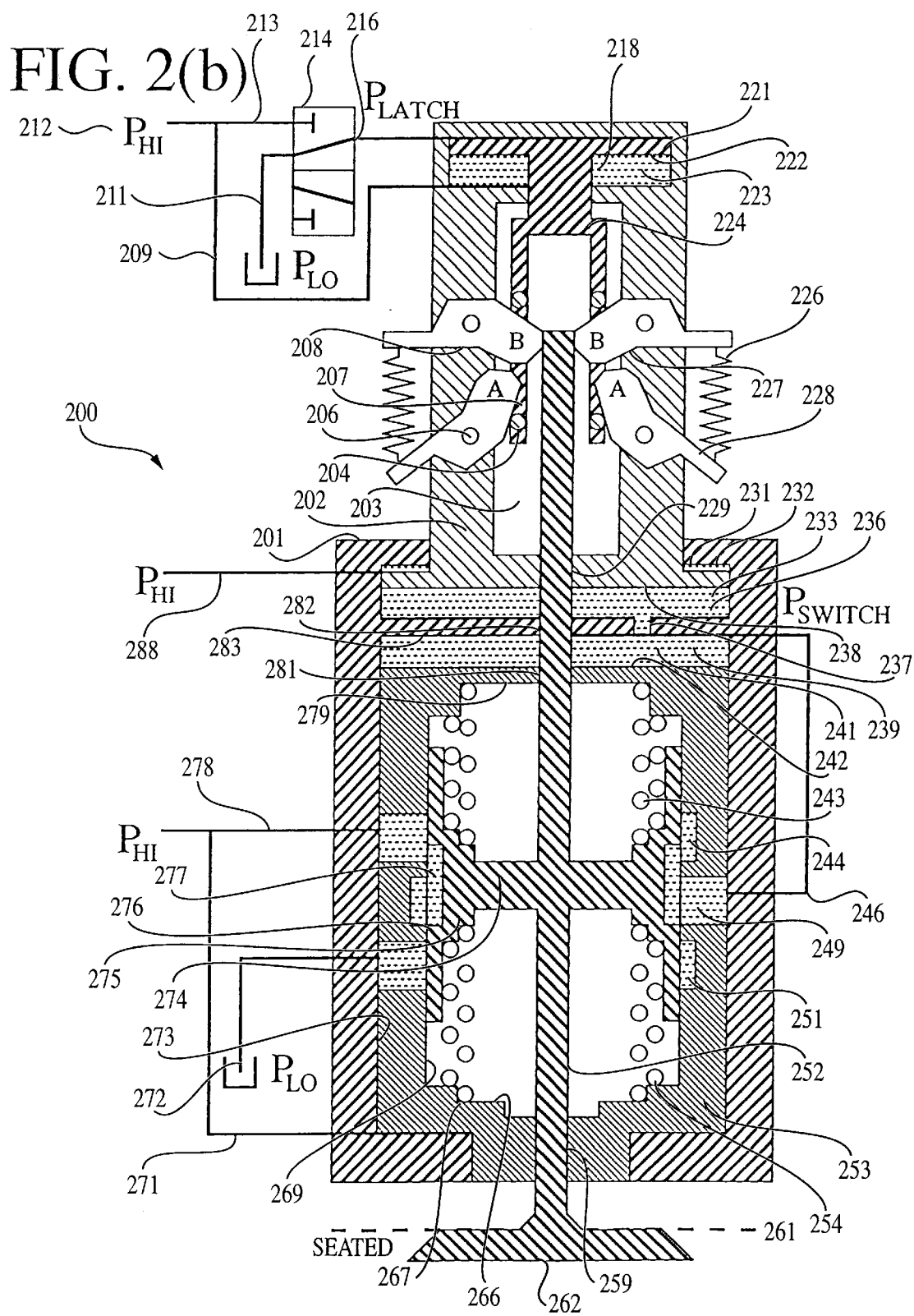

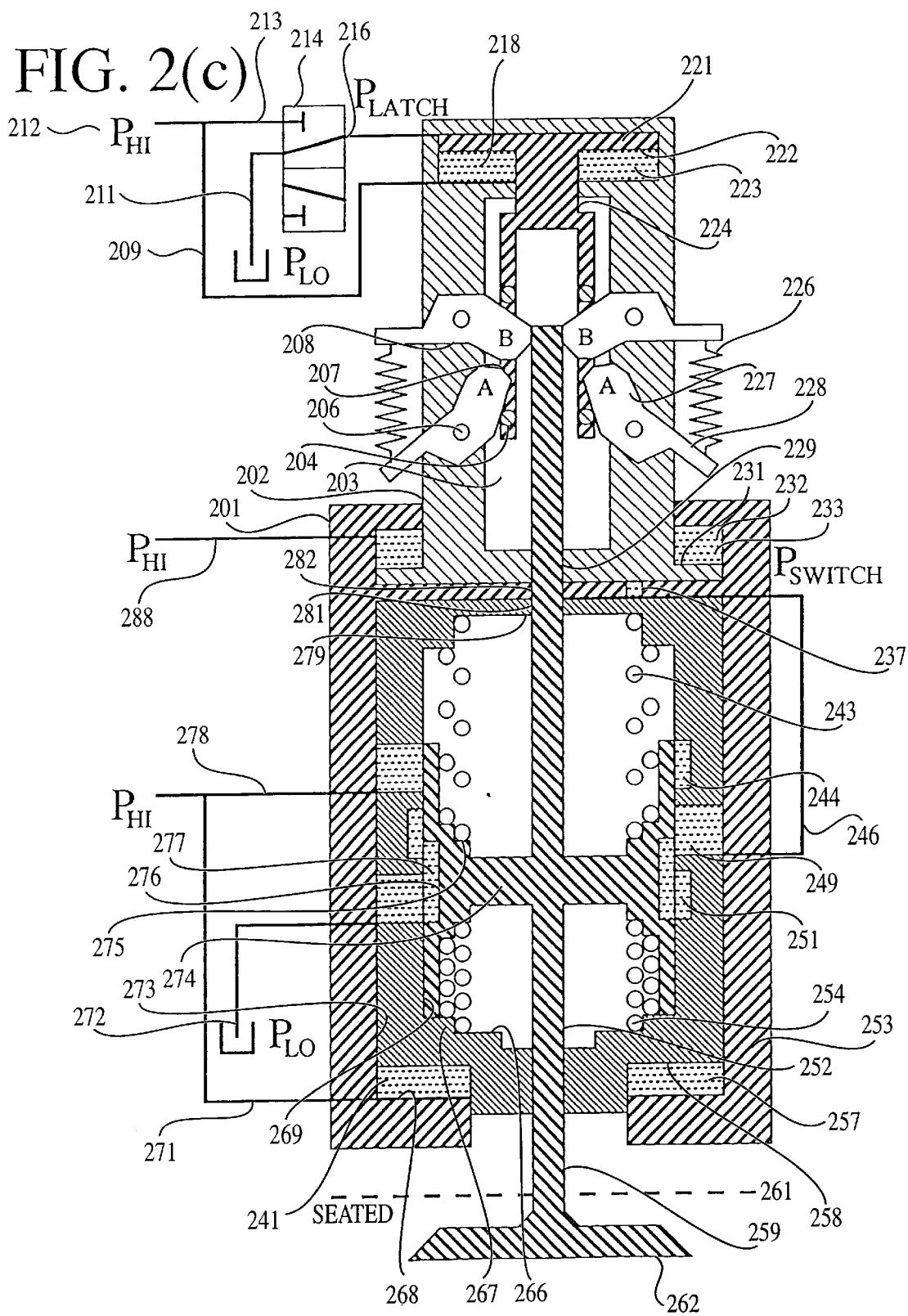

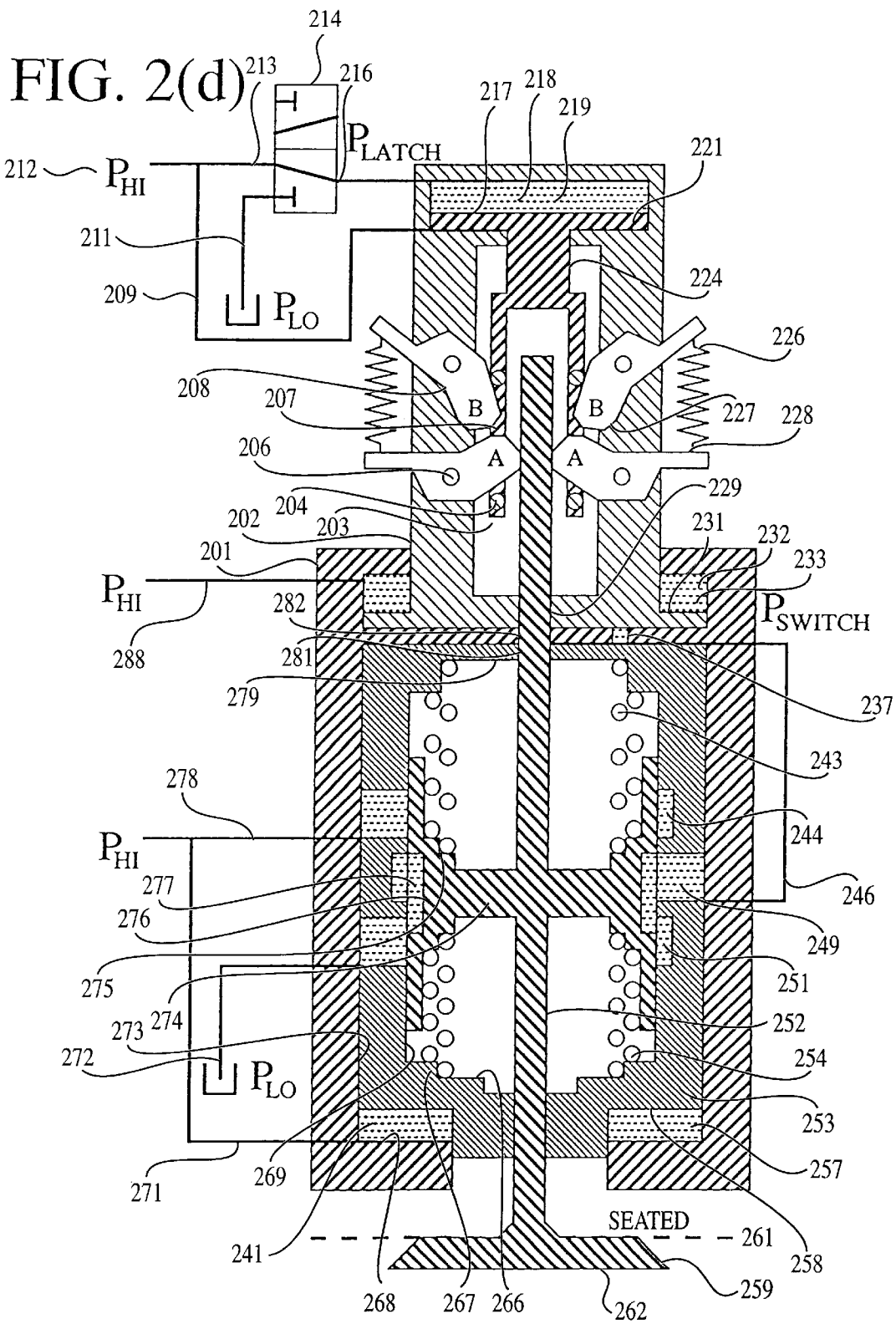

FIG. 2(e)

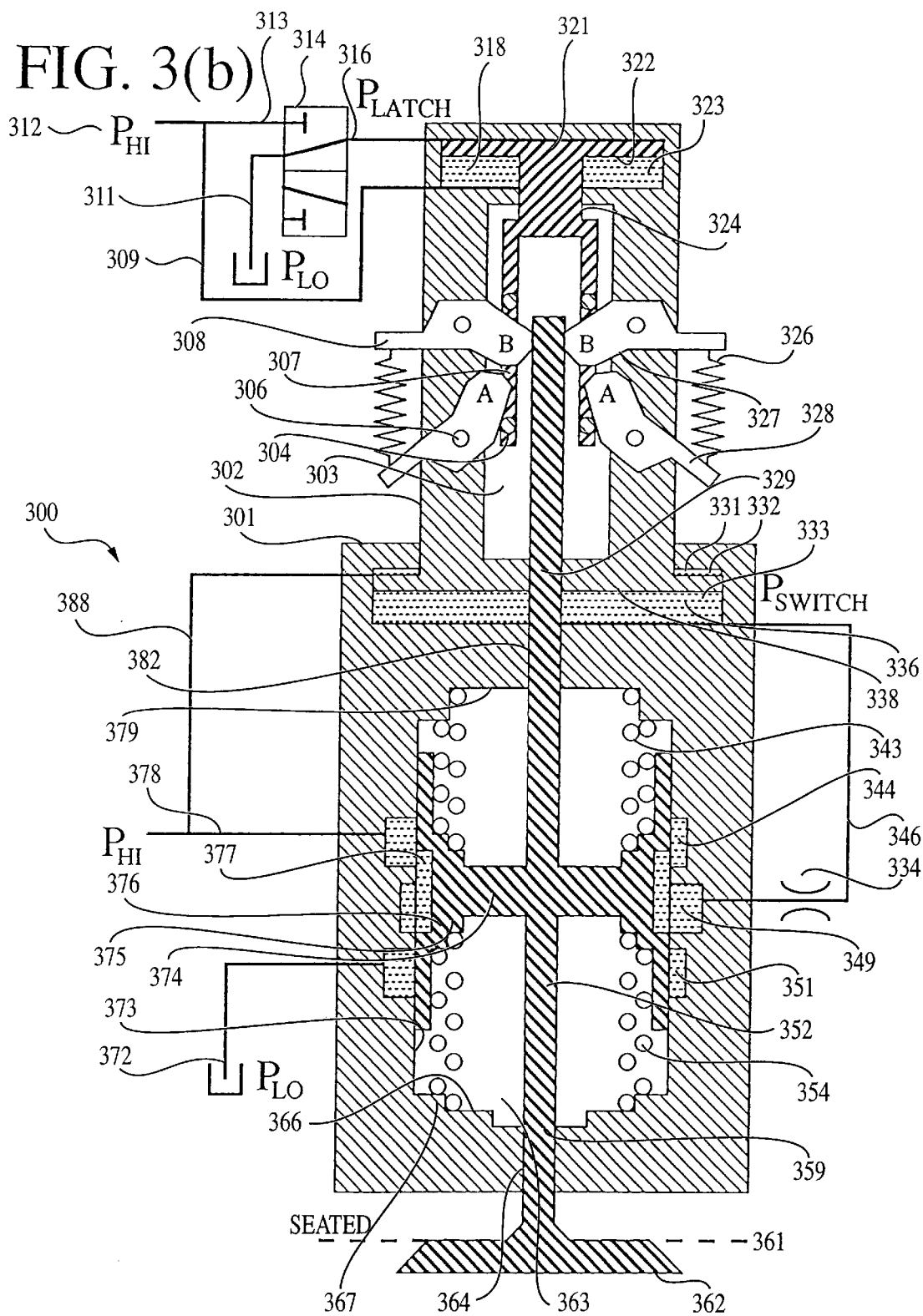

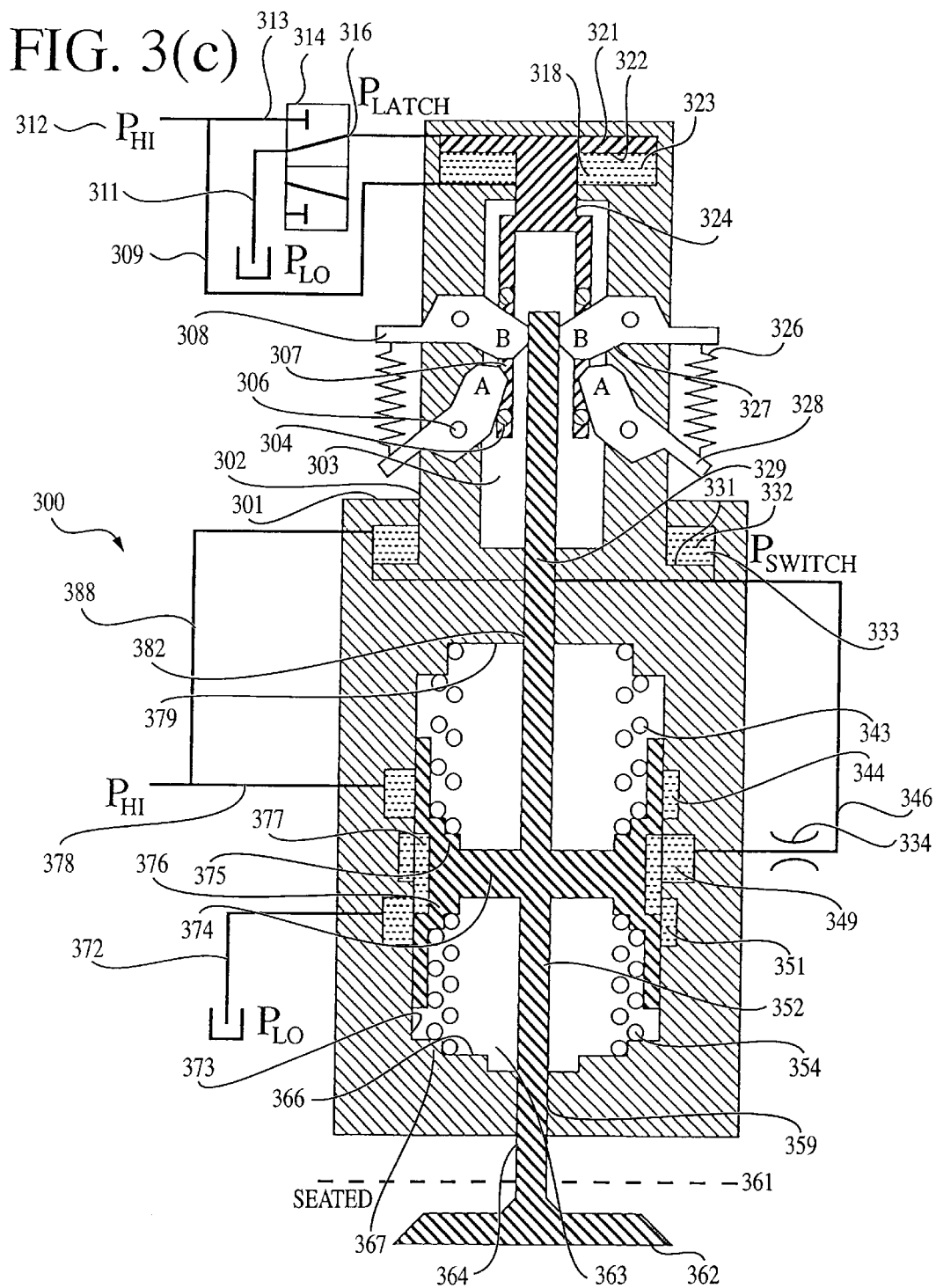

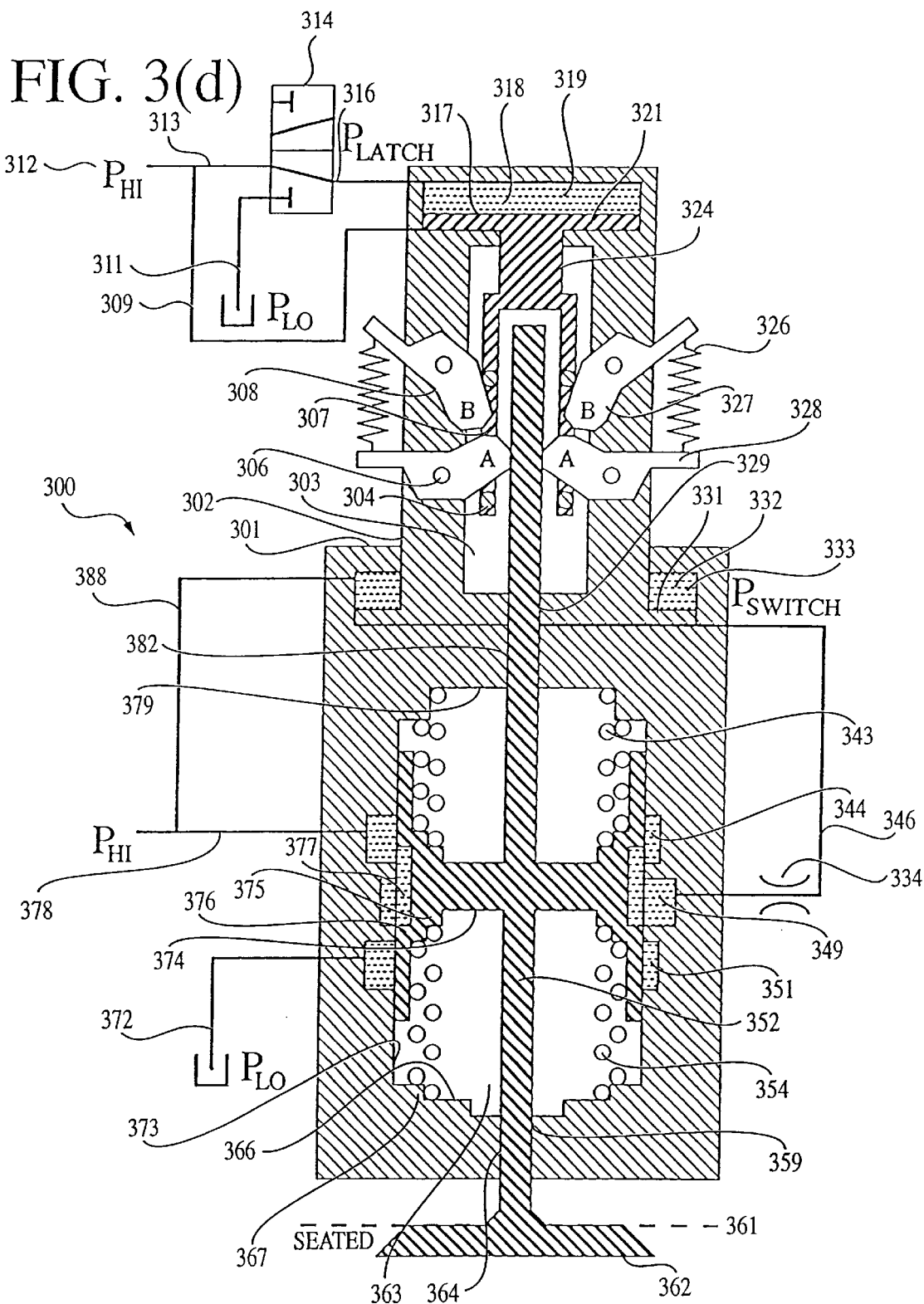

VARIABLE VALVE TIMING ACTUATOR

CROSS-REFERENCE TO RELATED APPLICATIONS

This application claims priority under 35 USC §119(e) to U.S. Provisional Patent Application No. 60/129,256 filed Apr. 14, 1999, the entirety of which is incorporated by reference herein.

FIELD OF THE INVENTION

This disclosure concerns an invention relating generally to valve actuators, and more specifically to valve actuators which are actuated hydraulically or electrically without use of cams.

BACKGROUND OF THE INVENTION

Usually valves in automobiles (cylinder intake and exhaust valves) are operated by cams driven from the engine's crankshaft. The cams are designed to provide valve behavior characteristics that result in desired engine economy and performance. There are three primary characteristics that define the behavior of a valve. First, valve timing refers to the engine piston or crankshaft position at which the valve begins to open. Second, duration refers to the amount of time a valve is open during each engine cycle (with dwell referring to the time that the valve is closed); these are generally determined by the cam profile. Finally, lift is the distance that the valve opens (typically around 0.4 inches/1 centimeter). Owing to the relationship between the valves, the cams, and the crankshaft, valve duration/dwell (when measured in seconds) will vary directly with engine speed, but timing (when measured as a function of crankshaft angle) and lift will tend to stay constant regardless of engine speed.

Unfortunately, valve timing, lift, and dwell/duration for optimal engine performance changes between low and high engine speeds and engine loading. As a result, varying the relationship between the crankshaft and camshaft may allow gains in performance at one speed and load, but these will generally lead to decreased economy at another speed and load, and vice versa. For example, a so-called "hot" cam would provide poor fuel economy and excessive emissions for idling and everyday driving, but the car would exhibit sporty high-power performance at higher speeds.

Auto manufacturers have therefore expressed great interest in developing means for adapting valve behavior during vehicle operation so as to allow changes in a vehicle's economy and performance. As an example, systems have been introduced wherein cam rotation is changed depending on the engine speed. Unfortunately, the systems achieve valve timing changes without a commensurate change in dwell/duration; for example, when the valve opens early, it also closes early, even though it is generally desirable to also keep the valve open for a longer time.

Other auto manufacturers have focused on the development of camless designs so as to decouple valve operation from crank operation—in other words, to allow the engine valves to open and close at different times with respect to the crankshaft position, a condition known as Variable Valve Timing (or VVT). Unfortunately, prior VVT schemes have also been largely unsuccessful. For example, electrical actuators (e.g., solenoids which actuate the valves) have thus far met with limited success because the components to be actuated have substantial inertia, and thus substantial energy demands.

SUMMARY OF THE INVENTION

The invention involves a variable valve timing actuator that allows the opening and closing of engine valves to be variably and individually controlled without using a camshaft. The ability to vary the lift, duration/dwell, and timing of each intake and exhaust valve provides for more efficient internal combustion engines, with attendant improvement in fuel economy and the opportunity to reduce harmful emissions. The invention utilizes energy regeneration so that energy delivered to a valve while accelerating it (less any friction or other losses) is recovered while it is decelerating. The losses are made up by adding energy to the actuator while the valve is stationary (or nearly so) in an open or closed state. The valves are maintained stationary by a latch (e.g., a one-way clutch) which is disengaged when the valve is to begin opening or closing. The one-way nature of this latch allows it to automatically lock the valve in its open (or closed) position without the need for a control input. Furthermore, no energy is required to hold the valves in their open (or closed) position, and only a small amount of energy is required to disengage the latch.

Regeneration is preferably provided by potential energy storage devices such as springs. The most preferred version of the invention utilizes an opposing spring design wherein springs impose an opening force on the valve, and once the valve is open, the opposing springs impose a closing force on the valve (as illustrated, e.g., in the accompanying FIGS. 1(a) and 1(c) by the springs 143/154 versus the valve 159). Since losses from valve exhaust forces, spring hysteresis, mechanical friction, etc. will not allow the opposing springs to open and close the valves in this manner unless make-up energy is added, make-up potential energy is input by (1) moving the spring seats in relation to the valve, thereby charging the springs against the valve (as illustrated by the exemplary variable valve timing actuator 100 of FIGS. 1(a)–1(e), discussed below), and/or by (2) moving the valve with respect to the spring seats to charge the springs (as illustrated by the exemplary variable valve timing actuator 300 of FIGS. 3(a)–3(d), discussed below). These acts are done after the potential energy within the springs has already been expended. To hold the valves into their open and closed positions when desired, latches (such as the sprag sets A and B shown throughout the various Figures) are used to releasably fix the valves in place.

The invention may be better understood if characteristics of preferred versions of the invention are briefly described. Turning, for example, to the versions of the invention exemplified by FIGS. 2(a)–2(e) (and also FIG. 5, though the following discussion will primarily reference FIG. 2), the valve actuator is seen to include a valve housing (201); a valve (259) having a valve head and a valve stem, with the valve being movable within the valve housing (as can be best visualized by comparing the FIGS. 2(a)–2(e)); one or more springs (243/254), each spring being situated between the valve and a spring charger assembly (253) which is movable with respect to the valve, wherein the spring(s) may urge the valve along the valve motion axis; and a latching assembly (202) which is also movable with respect to the valve, and which includes one or more latches (208), each latch being actuatable to selectively restrain the valve from motion in one direction along the valve motion axis (while allowing motion in the opposite direction along the valve motion axis). Preferably, the spring charger assembly is actuated to move with respect to the valve housing by fluid pressure in an adjacent spring charger assembly chamber (241); similarly, the latching assembly is actuated to move with respect to the valve by fluid pressure in an adjacent latching assembly chamber (233). The valve stem preferably has a valve switching cavity (277) defined therein so that motion of the valve stem selectively ports fluid to the spring charger assembly chamber, thereby altering the fluid pressure therein. In the embodiment of FIG. 2, this is done by defining a bridge cavity (249) within the spring charger assembly, the bridge cavity being in fluid communication with the spring charger assembly chamber, and also defining at least one spring charger assembly switching cavity (244/251) within the spring charger assembly, with each spring charger assembly switching cavity being in fluid communication with a pressurized fluid supply. When the valve moves, the valve switching cavity may connect the spring charger assembly switching cavity and the bridge cavity, thereby porting fluid from the spring charger assembly switching cavity to the spring charger assembly chamber and moving the spring charger assembly. Also in the embodiment of FIG. 2, the spring charger assembly chamber and the latching assembly chamber are in fluid communication via a bridging passage (237).

As a result of the foregoing arrangement, it can be seen from a comparison of FIGS. 2(a)–2(e) that motion of the valve through a complete cycle may be effected by simply altering the state of the latches, which allows the springs to drive the valve towards an open or closed position. As shown in FIGS. 2(a)–2(e), the state of the latches may be changed by simply actuating a piston (207), which makes the actuator easy to control. The potential energy in the springs is converted to kinetic energy, causing the valve to move as illustrated. When the energy in the springs is expended, the springs are "recharged" by repositioning the spring cartridge, thereby compressing and/or extending the springs with respect to the valve. Motion of the valve into the fully open and fully closed/seated states is assisted by the motion of the latching assembly, which grasps the valve via the latches. This motion of the latching assembly (and valve) can also participate in the addition of potential energy to the springs.

Other versions of the invention may eliminate the latching assembly (as in the version of FIGS. 1(a)–1(e)), or alternatively may eliminate the spring charger assembly (as in the version of FIGS. 3(a)–3(d) and FIG. 4, wherein the latching assembly performs the regeneration function by providing energy to the springs in lieu of the spring charger assembly). The version of FIG. 5 includes both a spring charger assembly and a latching assembly as in FIGS. 2(a)–2(e), but it is functionally different from the version of FIGS. 2(a)–2(e) insofar as the spring charger assembly of FIGS. 2(a)–2(e) primarily recharges the springs whereas its latching assembly primarily affects valve positioning (seating), whereas the spring charger assembly of FIG. 5 primarily affects valve positioning (lift) whereas its latching assembly primarily recharges the springs.

Further advantages, features, and objects of the invention will be apparent from the following detailed description of the invention in conjunction with the associated drawings.

BRIEF DESCRIPTION OF THE DRAWINGS

The accompanying drawings illustrate cross-sectional views of exemplary embodiments of actuators in accordance with the invention, with each drawing illustrating a step in the actuator's operating cycle. As an aid to the reader's understanding, the following brief description of each individual Figure is provided:

FIG. 1(c) illustrates the variable valve timing actuator of FIGS. 1(a) and 1(b) with its poppet valve situated in the fully open position.

FIG. 1(d) illustrates the variable valve timing actuator of FIGS. 1(a)–1(c) with its poppet valve moving toward the fully closed position.

FIG. 2(a) is a side elevation view of a cross-section of a second preferred embodiment of a variable valve timing actuator in accordance with the invention, shown with its poppet valve situated in the seated/closed position.

FIG. 2(b) illustrates the variable valve timing actuator of FIG. 2(a) with its poppet valve moving toward the fully open position.

FIG. 2(c) illustrates the variable valve timing actuator of FIGS. 2(a) and 2(b) with its poppet valve situated in the fully open position.

FIG. 2(d) illustrates the variable valve timing actuator of FIGS. 2(a)–2(c) with its poppet valve moving towards the fully closed position.

FIG. 2(e) illustrates the variable valve timing actuator of FIGS. 2(a)–2(d) with its poppet valve situated in the seated/closed position, immediately prior to the condition illustrated in FIG. 2(a).

FIG. 3(b) illustrates the variable valve timing actuator of FIG. 3(a) with its poppet valve moving toward the fully open position.

FIG. 3(c) illustrates the variable valve timing actuator of FIGS. 3(a) and 3(b) with its poppet valve situated in the fully open position.

FIG. 3(d) illustrates the variable valve timing actuator of FIGS. 3(a)–3(c) with its poppet valve moving towards the fully closed position.

DETAILED DESCRIPTION OF PREFERRED EMBODIMENTS OF THE INVENTION

Figure 1A:
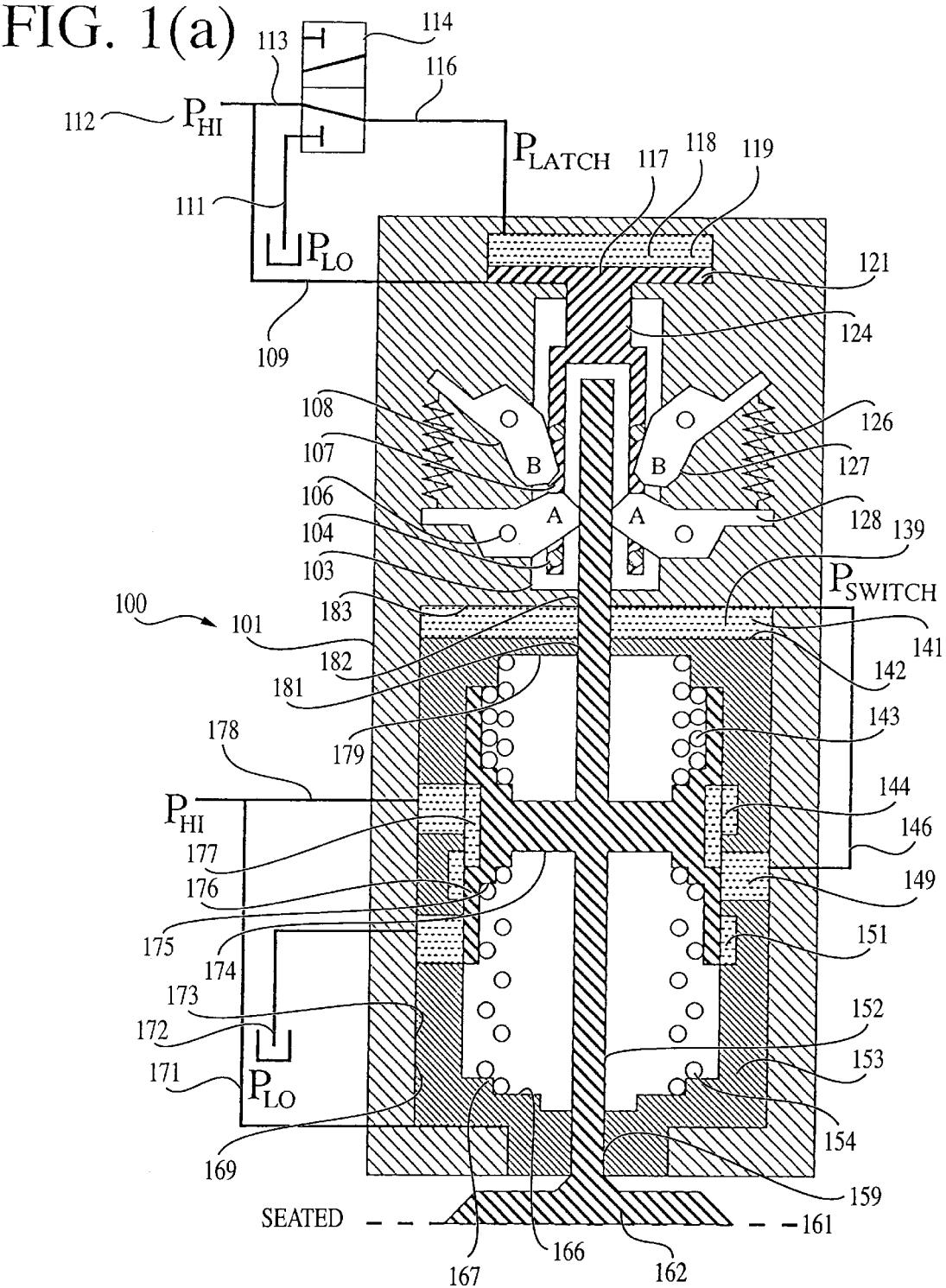
FIG. 1(a) is a side elevation view of a cross-section of a first preferred embodiment of a variable valve timing actuator in accordance with the invention, shown with its poppet valve situated in the seated/closed position.
Figure 1B:
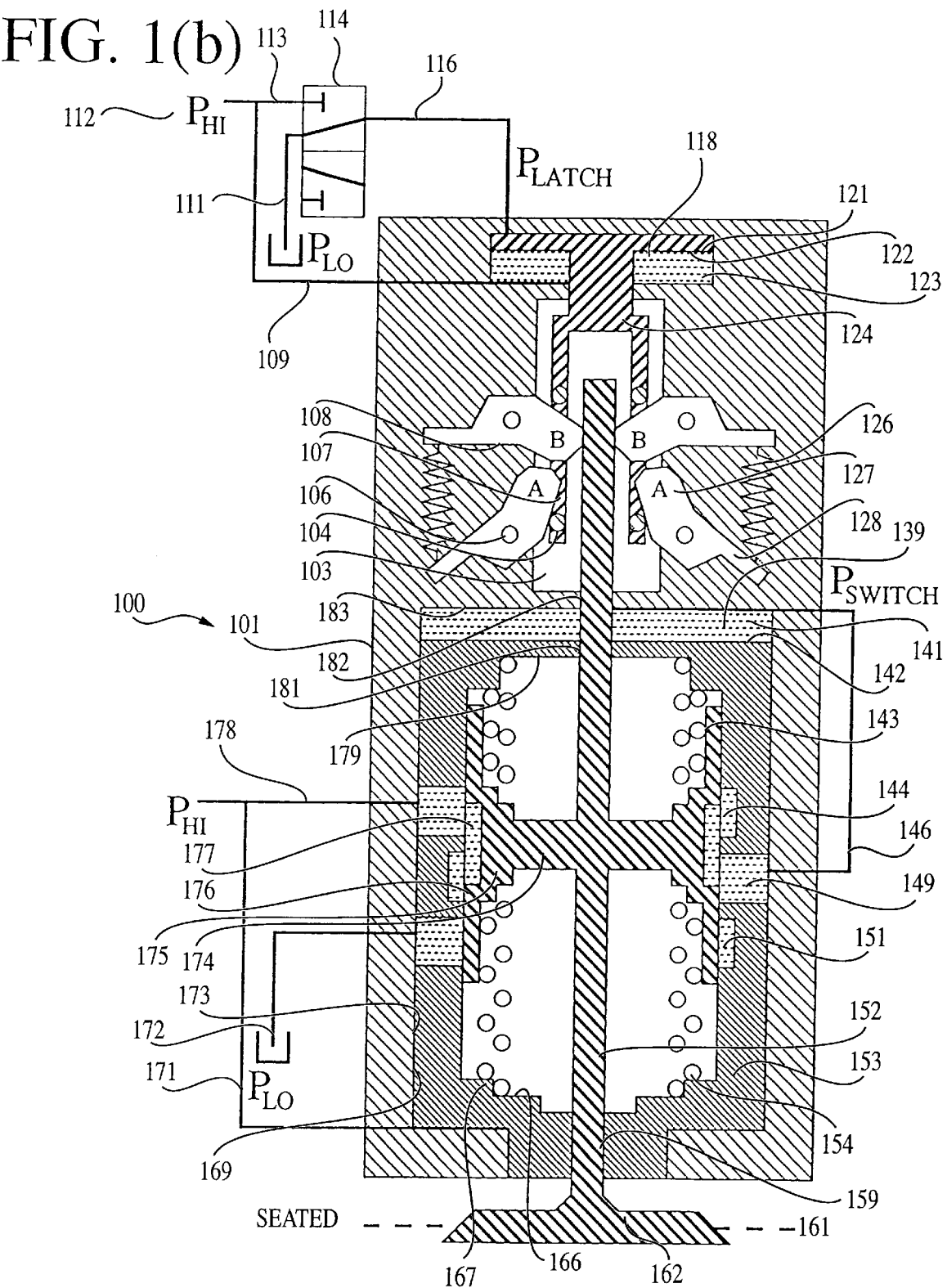
FIG. 1(b) illustrates the variable valve timing actuator of FIG. 1(a) with its poppet valve moving toward the fully open position.

Following are descriptions of exemplary regenerative hydraulic valve actuators suitable for controlling the opening and closing of poppet valves for internal combustion engines, both spark ignition and diesel. They each provide several advantageous features:

1) They can vary the opening and closing times of the valve, with each of these times being independent of the other.
2) Since regeneration is used, the only energy required of the system is the makeup energy necessary to overcome the small friction in the mechanism, and the gas pressures and flow forces present at various times in the cylinder. The hydraulic flow for adding make-up energy (i.e., adding to the compression of the springs) is passively controlled by the position of the poppet valve itself. The make-up energy is provided twice each cycle, when the valve is fully open and when it is fully closed/seated.
3) It is possible to vary the valve lift independently of the opening and closing times. Variable lift control is not expressly provided for in all of the following embodiments (in the variable valve timing actuators 100, 200, 300, and 400 of FIGS. 1–4), but since lift is controlled hydraulically, it should be relatively easily implemented (as illustrated in the variable valve timing actuator 500 of FIG. 5). It is noted that lift control may not be necessary and may in some cases add undue cost and complexity, in view of the fact that most of the advantages of variable lift can be provided by variable timing and duration/dwell. Nevertheless, there may be some circumstances where the benefits of lift control justify its implementation.

In the following descriptions, the structures of the variable valve timing actuators will first be described, followed by a discussion of their operation. For certain embodiments (the variable valve timing actuators 100, 200, and 300), the operation of the variable valve timing actuator is illustrated over an entire operating cycle in the corresponding drawings. It is noted that in the drawings, the reference numerals provided for each component are numbered in ascending order in the clockwise direction about the illustrated embodiment (wherever possible), with the lowest reference numeral being situated at the center of the left-hand side of the drawings (at approximately the 9 o'clock position).

1. First Embodiment: Basic Variable Valve Timing Actuator System

With reference to FIGS. 1(a)–1(e), and particularly to FIG. 1(a), a first "basic" variable valve timing actuator embodiment is designated generally by the reference numeral 100. A brief overview of the variable valve timing actuator 100 will now be provided prior to discussing the actuator 100 in detail.

The variable valve timing actuator 100 includes a housing 101 which has a fixed position with respect to the cylinder head of the engine. Within the housing 101, a housing spring charger assembly chamber 141, a latching piston output chamber 103, and a latching piston input chamber 118 are defined within its interior. A poppet valve 159 is movable within the housing 101 so that it may reciprocate through the housing spring charger assembly chamber 141 and latching piston output chamber 103. The poppet valve 159 is also slidable within a spring charger assembly 153, which may be slidably actuated within the housing spring charger assembly chamber 141 by the pressure of fluid contained therein. The spring charger assembly 153 contains concentric upper springs 143 and lower springs 154 which bear against the poppet valve 159. Within the latching piston output chamber 103, latches (latching sprags) 108 pivotally mounted to the housing 101 may selectively engage the poppet valve 159 to act as one-way clutches, preventing motion of the poppet valve 159 with respect to the housing 101. The latching sprags 108 are actuated by a latching piston 107, which is actuated by the pressure of fluid within the latching piston input chamber 118 to move within the latching piston output chamber 103 of the housing 101. As will be better realized from the following more detailed discussion of these components and their interaction, actuation of the latching piston 107 to appropriate positions enables the poppet valve 159 to be urged between its fully open (fully extended) and fully closed (fully retracted) positions by the springs 143 and 154, thereby converting the potential energy of the springs to kinetic energy of the poppet valve 159. The overall potential energy of the spring system 143/154 is increased by appropriate positioning of the spring charger assembly 153.

The poppet valve 159 includes an elongated poppet valve stem 152 extending from a poppet valve head 162. The poppet valve stem 152 extends from within the latching piston output chamber 103, through a housing valve entry bore 182 in the housing 101, and into the housing spring charger assembly chamber 141 and through a central spring charger assembly bore 181 in the spring charger assembly 153. As a result, the poppet valve 159 may move with respect to both the housing 101 and the spring charger assembly 153, as shown by the various FIGS. 1(a)–1(e). The dashed line 161 near the poppet valve head 162, which is also labeled "seated", is used to illustrate the position at which the face of the poppet valve head 162 is located when the poppet valve 159 is fully seated (with the seat structure not being illustrated in the Figures). As can be seen by comparing the various FIGS. 1(a)–1(e), the poppet valve 159 is capable of moving between the seated (fully closed) valve position indicated by the dashed line 161 in FIGS. 1(a) and (e) to the fully open position illustrated in FIG. 1(c).

The poppet valve stem 152 includes a poppet valve spool arm 174 extending radially outwardly to terminate at a poppet valve switching spool 176 having a poppet valve switching spool cavity 177 defined therein. The poppet valve switching spool 176 is closely situated against the circumferential interior spring charger assembly wall 169 so that it may slide against the interior wall 169 in fluid-tight engagement. Thus, the poppet valve switching spool 176 and poppet valve switching spool cavity 177 are repositioned along the circumferential interior spring charger assembly wall 169 as the poppet valve 159 (and the spring charger assembly 153) move, as can be seen from FIGS. 1(a)–1(e).

When viewing the various FIGS. 1(a)–1(e), it should be understood that the poppet valve 159 and spring charger assembly 153 are preferably constructed symmetrically about the axis of the poppet valve stem 152—in other words, the structure of the poppet valve 159 and spring charger assembly 153 may be defined in large part by the volume swept by the rotation of the poppet valve 159 and spring charger assembly 153 (as depicted by the two-dimensional drawing of FIG. 1(a)) about the axis of the poppet valve stem 152. Thus, the poppet valve spool arm 174 (as well as the poppet valve switching spool 176, etc.) preferably extends circumferentially about the poppet valve stem 152. However, as can be seen by comparing the right and left sides of the spring charger assembly 153 in FIGS. 1(a)–1(e), the spring charger assembly 153 is not entirely symmetrical about the axis of the poppet valve stem 152 insofar as certain cavities defined therein (denoted 144, 151, and 149 and discussed at greater length elsewhere) do not have dimensions of constant size as they extend about the circumference of the valve spring charger assembly 153 (else they would section the valve spring charger assembly 153 into separate and unconnected sections). It should be understood that the structure of the spring charger assembly 153 (as well as the other components shown and described) may assume a wide variety of structural configurations other than the ones shown, the only real requirement being that the parts are capable of interacting to provide the desired effects discussed in this document. As an example, if desired, the poppet valve spool arm 174 (as well as the poppet valve switching spool 176, etc.) need not extend circumferentially about the entirety of the poppet valve stem 152, and instead could be formed in one or more discrete sections branching outwardly from the poppet valve stem 152. It is also noted that if poppet valve spool arm 174 is formed as a continuous disk extending about the perimeter of the poppet valve stem 152, it preferably includes one or more apertures (not shown) extending through it so that as the poppet valve 159 and poppet valve spool arm 174 move through the interior of the spring charger assembly 153, the pressure in the air (or other fluid) at the opposing sides of the poppet valve spool arm 174 within the interior of the spring charger assembly 153 may be equalized.

The poppet valve spool arm 174 bears spring seats 175 against which the springs 143 and 154 are seated, with upper springs 143 being engaged between the upper interior spring charger assembly walls 179 and spring seats 175 on the poppet valve spool arm 174, and lower springs 154 being engaged between the lower interior spring charger assembly walls 166 and spring seats 175 on the poppet valve spool arm 174. While a pair of adjacent, concentrically-situated spring seats 175 are illustrated for each of the upper and lower springs 143 and 154 (since two upper springs 143 and two lower springs 154 are illustrated), it should be understood that a greater or lesser number of spring seats 175 may be provided depending on whether more or less than two springs 143 and 154 are provided. Depending on the characteristics of the actuator 100 when it is implemented, it may even omit one of the upper and lower springs 143 and 154, in which case spring seats 175 may be provided on only one side of the poppet valve spool arm 174.

The spring charger assembly 153 is a generally cylindrical mass configured to closely engage and slide against the circumferential interior housing chamber wall 173, and between the upper interior housing chamber wall 183 (shown only in FIGS. 1(*a*) and 1(*b*)) and the lower interior housing chamber wall 168 (shown only in FIGS. 1(*c*)–1(*e*)), in fluid-tight relationship. The housing spring charger assembly chamber 141 is thus partially occupied by the spring charger assembly 153, with its remainder being defined by one or more of a spring charger assembly extension chamber 139 and a spring charger assembly retraction chamber 157. The spring charger assembly extension chamber 139—which is visible in FIGS. 1(*a*) and 1(*b*), but not in FIGS. 1(*c*)–1(*e*)—is defined between a larger top spring charger assembly face 142 (shown only in FIGS. 1(*a*) and 1(*b*)) located at the top of the spring charger assembly 153, the top and circumferential walls of the housing spring charger assembly chamber 141, and the poppet valve stem 152. The spring charger assembly retraction chamber 157— which is visible in FIGS. 1(*c*)–1(*e*), but not in FIGS. 1(*a*) and 1(*b*)—is defined between a smaller bottom spring charger assembly face 158 (also shown only in FIGS. 1(*c*)–1(*e*)) located at the bottom of the spring charger assembly 153, and the bottom and circumferential walls of the housing spring charger assembly chamber 141. As can be seen from a comparison of FIGS. 1(*a*) and 1(*b*) versus FIGS. 1(*c*)–(*e*), when the spring charger assembly 153 moves downward (into its extended position), the spring charger assembly extension chamber 139 grows in volume while the volume of the spring charger assembly retraction chamber 157 is reduced. Similarly, it can be seen from the same Figures that when the spring charger assembly 153 moves upward (into its retracted position), the spring charger assembly retraction chamber 157 grows in volume while the spring charger assembly extension chamber 139 is reduced. The spring charger assembly 153 is configured as a double-acting piston having a larger spring charger assembly face 142 adjacent the spring charger assembly extension chamber 139 and a smaller spring charger assembly face 158 adjacent the spring charger assembly retraction chamber 157. Therefore, if the same fluid pressure exists within each of the spring charger assembly extension chamber 139 and the spring charger assembly retraction chamber 157, net force is exerted on the larger spring charger assembly face 142 than on the smaller spring charger assembly face 158 owing to its greater area, and the spring charger assembly 153 will move downward (into its extended position).

As previously noted, the sprags 108 act as one-way clutches for restraining the poppet valve 159 from motion in undesired directions. The sprags 108 each include a sprag tail 128, an opposing sprag head 127 which may engage and disengage the poppet valve stem 152, and an intermediate sprag pivot point 106 which is fixed with respect to the housing 101 and about which the sprag tail 128 and head 127 may rotate. Two co-acting pairs of latching sprags 108 are illustrated, with one pair being designated by the reference character A in the Figures and the other pair being designated by the reference character B. The sprag pair A prevents downward motion of the poppet valve 159 (towards a more open state) when its sprag heads 127 engage the poppet valve stem 152, but it allows upward motion of the poppet valve 159 (towards a closed state). Conversely, the sprag pair B prevents upward motion of the poppet valve 159 (towards a more closed state) when its sprag heads 127 engage the poppet valve stem 152, but it allows downward motion of the poppet valve 159 (towards an open state). Sprag springs 126 connect the sprag tails 128 between the sprag sets A and B so as to assist the engagement of one of the sprag sets against the poppet valve stem 152 when the other is disengaged.

The latching piston 107 includes a latching piston input end 121 which is actuated by fluid pressure within the latching piston input chamber 118, and a latching piston output end 124 which moves within the latching piston output chamber 103 to actuate the sprags 108. The latching piston input end 121 is configured as a double-acting piston having a larger latching piston face 117 (shown in FIGS. 1(*a*), 1(*d*), and 1(*e*)) and a smaller latching piston face 122 (shown in FIGS. 1(*b*) and 1(*c*)). The latching piston output end 124 has an annular or bifurcated configuration which allows it to reciprocate coaxially about the valve stem 152 and actuate the sprags 108, as will be discussed at greater length below. However, it should be understood that the configuration of the latching piston output end 124 may vary in accordance with the number of sprags 108 provided (which could be less than or more than two pairs, e.g., there might be only one upward-locking sprag and only one downward-locking sprag); more generally, its configuration may vary in accordance with the nature and configuration of the one-way clutch arrangement being used. It should also be understood that the latching piston output end 124 need not necessarily move coaxially about the poppet valve stem 152.

Figure 1E:
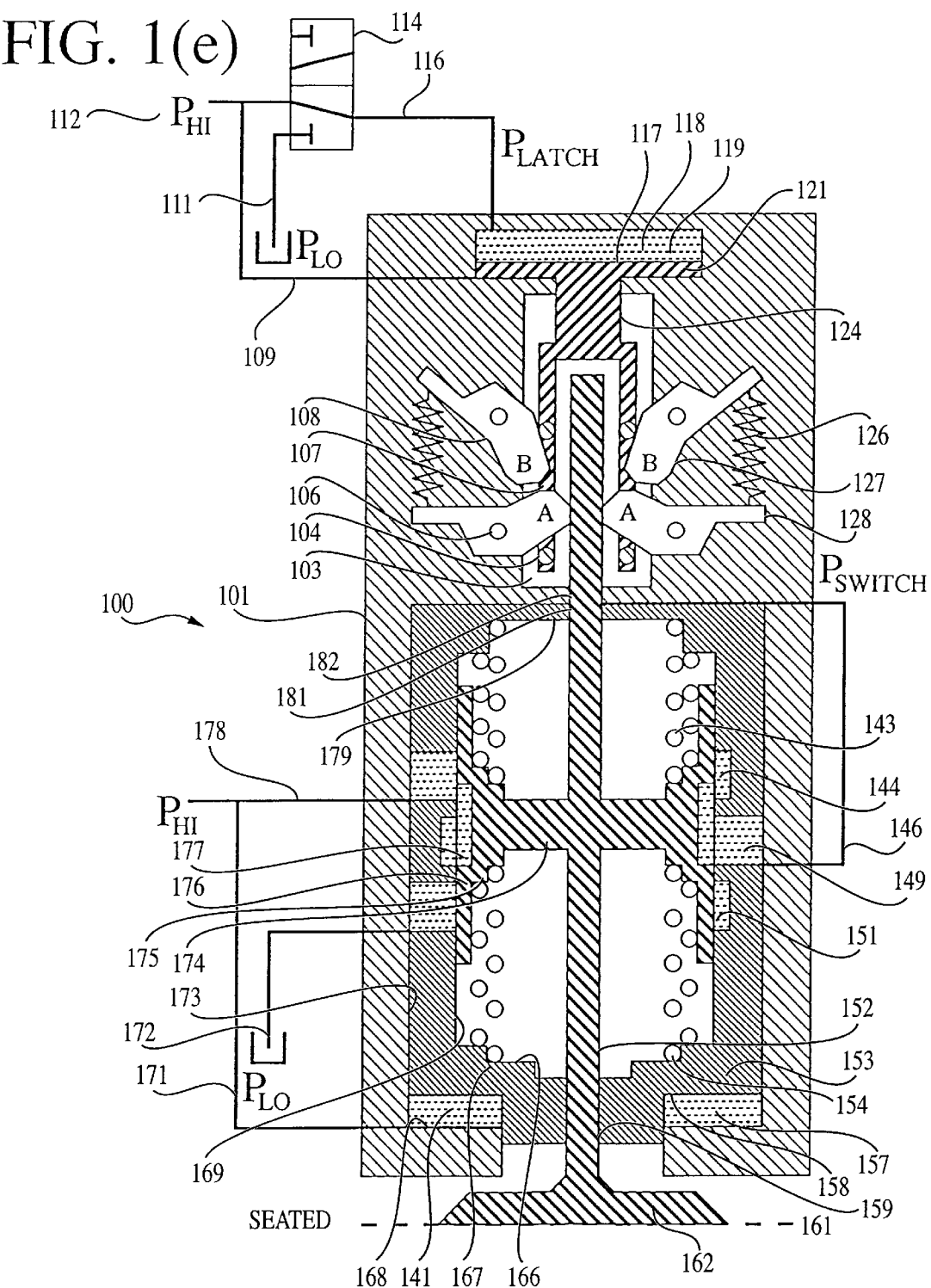
FIG. 1(e) illustrates the variable valve timing actuator of FIGS. 1(a)–1(d) with its poppet valve situated in the seated/closed position, immediately prior to the condition illustrated in FIG. 1(a).

The latching piston output end 124 bears toggles 104 which bear against the sprags 108 to move the sprag sets A and B between the engaged and disengaged positions. As can be seen in FIGS. 1(a), 1(d), and 1(e), when the latching piston 107 is extended (moved downward), the toggles 104 disengage the sprag set B, thereby engaging sprag set A owing to the force of the sprag springs 126. Similarly, as can be seen from FIGS. 1(b) and 1(c), when the latching piston 107 is retracted (moved upward), the toggles 104 disengage sprag set A from the poppet valve stem 152 and the sprag springs 126 thereby engage sprag set B.

Fluid conduits are then provided in conjunction with the latching piston input chamber 118 to allow the latching piston input end 121 (and thus the latching piston 107 in general) to be hydraulically actuated. Initially, a pair of high pressure lines 113 and 109 lead from a high pressure fluid source 112 (having a pressure designated $P_{HI}$). One high pressure line 109 is in permanent connection with a latching piston retraction chamber 123 (shown in FIGS. 1(b) and 1(c)) adjacent the smaller latching piston face 122 of the latching piston input end 121. The other high pressure line 113 leads to a three-way, two-position valve 114 which is selectively connectable to a latching line 116—the latching line 116 having its pressure designated $P_{LATCH}$—which leads to a latching piston extension chamber 119 adjacent the larger latching piston face 117 of the latching piston input end 121. The valve 114 may also connect a low pressure line 111—having a pressure designated $P_{LO}$—to the latching line 116, thereby setting $P_{LATCH}$ equal to $P_{LO}$.

It can be seen that when the valve 114 is adjusted to set $P_{LATCH}$ equal to $P_{HI}$, as in FIGS. 1(a), 1(d), and 1(e), equal (high) fluid pressure is exerted on both the larger latching piston face 117 and the smaller latching piston face 122 of the latching piston input end 121. As a result, net force is exerted on the larger latching piston face 117 and the latching piston 107 will move downward into its extended position, wherein sprag set B is disengaged and sprag set A is engaged. On the other hand, when the valve 114 is moved as in FIGS. 1(b) and 1(c) to set $P_{LATCH}$ equal to $P_{LO}$, low pressure is exerted on the larger latching piston face 117 of the latching piston input end 121 and high pressure is exerted on the smaller latching piston face 122. Provided $P_{HI}$, $P_{LO}$, and the sizes of the smaller latching piston face 122 and larger latching piston face 117 are chosen so that the force on the smaller latching piston face 122 exceeds the force on the larger latching piston face 117 (as is intended), the latching piston 107 will move upward into its retracted position (wherein sprag set A is disengaged and sprag set B is engaged).

Fluid conduits are also provided in conjunction with the spring charger assembly 153 and the poppet valve 159 to provide a switching arrangement for transferring potential energy to the springs 143 and 154. Initially, high pressure lines 178 and 171—whose pressure is designated by $P_{HI}$—extend (1) through the housing 101 to a high pressure spring charger assembly switching cavity 144 defined on the circumferential interior spring charger assembly wall 169 adjacent the poppet valve switching spool 176 of the poppet valve 159; and (2) to the spring charger assembly retraction chamber 157 situated adjacent the smaller bottom spring charger assembly face 158, this chamber 157 only being fully shown in FIGS. 1(c)–1(e). A low pressure line 172—whose pressure is designated $P_{LO}$—then extends through the housing 101 to a low pressure spring charger assembly switching cavity 151 defined on the circumferential interior spring charger assembly wall 169 adjacent the poppet valve switching spool 176 of the poppet valve 159. A switching line 146—having a variable pressure designated $P_{SWITCH}$—then leads between the spring charger assembly extension chamber 139 situated adjacent to the larger top spring charger assembly face 142, and a bridge cavity 149 defined about the circumferential interior spring charger assembly wall 169 adjacent to the poppet valve switching spool 176. Depending on the location of the poppet valve switching spool 176 with respect to the bridge cavity 149, the poppet valve switching spool cavity 177 may connect the high pressure spring charger assembly switching cavity 144 to the switching line 146, thereby setting $P_{SWITCH}$ equal to $P_{HI}$ (as in FIGS. 1(a) and 1(b)), or it may connect the low pressure spring charger assembly switching cavity 151 to the switching line 146, thereby setting $P_{SWITCH}$ equal to $P_{LO}$ (as in FIGS. 1(c) and 1(d)). When $P_{SWITCH}$ is equal to $P_{HI}$, high pressure is exerted on the larger top spring charger assembly face 142 and also the smaller bottom spring charger assembly face 158. Net force is thus exerted on the larger top spring charger assembly face 142, moving the spring charger assembly 153 downward into its extended position. On the other hand, when the poppet valve 159 is extended to such an extent that the poppet valve switching spool cavity 177 connects the bridge cavity 149 and the low pressure spring charger assembly switching cavity 151, $P_{SWITCH}$ will be set equal to $P_{LO}$, thereby allowing the high pressure fluid adjacent the smaller bottom spring charger assembly face 158 to generate sufficient force that the spring charger assembly 153 is moved upward into its retracted position.

An operational cycle of the variable valve timing actuator 100 can then be summarized as follows:

Step 1.(a): Poppet Fully Closed (FIG. 1(a))

The latching line 116 is connected to the high pressure line 113, thereby setting $P_{latch}$ equal to $P_{HI}$. As a result, the latching piston 107 is extended towards the poppet valve 159, thereby:

Engaging the lower sprag set A, preventing downward motion of the poppet valve 159 towards the open state.

Disengaging the upper sprag set B, allowing upward motion of the poppet valve 159 towards the closed state.

The poppet valve 159 is therefore latched in the closed state against the poppet valve seat (not shown) by the lower sprag set A, and is prevented from moving downward.

Additionally, the switching line 146 is in fluid communication with the high pressure line 178, thereby setting $P_{SWITCH}$ equal to $P_{HI}$. The spring charger assembly 153 is therefore in the extended position (closer to the poppet valve head 162), compressing the upper springs 143. The upper springs 143 are therefore prepared to urge the poppet valve 159 towards the open state (converting the potential energy of the springs 143 into kinetic energy of the opening poppet valve 159) once the sprags 108 allow it. It is noted that the lower springs 154 may be in tension, may have no load, or may have a small compressive load (one less than that of the upper springs 143) depending on the dimensions, loading characteristics, etc. of the design.

Step 1.(a).1: Just Before Poppet Begins Opening (Not Shown in Drawings)

The latching line 116 is connected to the low pressure line 111, thereby setting $P_{latch}$ equal to $P_{LO}$. As a result, the latching piston 107 is retracted away from the poppet valve 159, thereby:

Disengaging the lower sprag set A, allowing downward motion of the poppet valve 159 towards the open state.

Engaging the upper sprag set B, preventing upward motion of the poppet valve 159 towards the closed state.

The poppet valve 159 is therefore urged towards the open state owing to the potential energy of the compressed upper springs 143.

The switching line 146 is in fluid communication with the high pressure line 178, thereby setting P$_{SWITCH}$ equal to P$_{HI}$ so that the spring charger assembly 153 is in the extended position (closer to the poppet valve head 162).

Step 1.(b): Poppet Opening (FIG. 1(*b*))

The latching line 116 is connected to the low pressure line 111, thereby setting P$_{latch}$ equal to P$_{LO}$. As a result, the latching piston 107 is retracted away from the poppet valve 159, thereby:

Disengaging the lower sprag set A, allowing downward motion of the poppet valve 159 towards the open state.

Engaging the upper sprag set B, preventing upward motion of the poppet valve 159 towards the closed state.

The poppet valve 159 is therefore urged towards the open state owing to the potential energy of the compressed upper springs 143, and is shown halfway open.

P$_{SWITCH}$ is in transition from P$_{HI}$ to P$_{LO}$ owing to the motion of the poppet valve 159 (more specifically, owing to the movement of the poppet valve switching spool cavity 177 towards a position connecting the bridge cavity 149 to the low pressure spring charger assembly switching cavity 151).

Step 1.(c): Poppet Fully Opened (FIG. 1(*c*))

The latching line 116 is connected to the low pressure line 111, thereby setting P$_{latch}$ equal to P$_{LO}$. As a result, the latching piston 107 is retracted away from the poppet valve 159, thereby:

Disengaging the lower sprag set A, allowing downward motion of the poppet valve 159 towards the open state.

Engaging the upper sprag set B, preventing upward motion of the poppet valve 159 towards the closed state.

With the potential energy in the upper springs 143 being expended, the poppet valve 159 is latched in the open state away from the poppet valve seat (not shown) by the upper sprag set B.

The switching line 146 is in fluid communication with the low pressure line 172, thereby setting P$_{SWITCH}$ equal to P$_{LO}$. The spring charger assembly 153 is therefore moved to the retracted position distant from the poppet valve head 162, adding to the compression of the lower springs 154 and thereby adding potential energy for the later closing of the poppet valve 159.

Step 1.(c).1: Just Before Poppet Begins Closing (Not Shown in Drawings)

The latching line 116 is connected to the high pressure line 113, thereby setting P$_{latch}$ equal to P$_{HI}$. As a result, the latching piston 107 is extended towards the poppet valve 159, thereby:

Engaging the lower sprag set A, preventing downward motion of the poppet valve 159 towards the open state.

Disengaging the upper sprag set B, allowing upward motion of the poppet valve 159 towards the closed state.

The poppet valve 159 is therefore urged towards the closed state owing to the potential energy of the compressed lower springs 154.

The switching line 146 is in fluid communication with the low pressure line 172, thereby setting P$_{SWITCH}$ equal to P$_{LO}$. The spring charger assembly 153 is therefore moved to the retracted position distant from the poppet valve head 162, Step 1.(d): Poppet Closing (FIG. 1(*d*))

The latching line 116 is connected to the high pressure line 113, thereby setting P$_{latch}$ equal to P$_{HI}$. As a result, the latching piston 107 is extended towards the poppet valve 159, thereby:

Engaging the lower sprag set A, preventing downward motion of the poppet valve 159 towards the open state.

Disengaging the upper sprag set B, allowing upward motion of the poppet valve 159 towards the closed state.

The poppet valve 159 is therefore urged towards the closed state owing to the potential energy of the compressed lower springs 154, and is shown halfway closed.

P$_{SWITCH}$ is in transition from P$_{LO}$ to P$_{HI}$ owing to the motion of the poppet valve 159 (more specifically, owing to the movement of the poppet valve switching spool cavity 177 towards a position connecting the bridge cavity 149 to the high pressure spring charger assembly switching cavity 144).

Step 1.(e): Poppet Fully Closed (FIG. 1(*e*))

The latching line 116 is connected to the high pressure line 113, thereby setting P$_{latch}$ equal to P$_{HI}$. As a result, the latching piston 107 is extended towards the poppet valve 159, thereby:

Engaging the lower sprag set A, preventing downward motion of the poppet valve 159 towards the open state.

Disengaging the upper sprag set B, allowing upward motion of the poppet valve 159 towards the closed state.

The poppet valve 159 is therefore latched in the closed state against the poppet valve seat (not shown) by the lower sprag set A.

Additionally, the switching line 146 is in fluid communication with the high pressure line 178, thereby setting P$_{SWITCH}$ equal to P$_{HI}$. The spring charger assembly 153 is therefore about to move to the extended position (closer to the poppet valve head 162). It is important to note that FIG. 1(*e*) shows the spring charger assembly 153 in this state: since the pressure in the spring charger assembly extension chamber 139 (P$_{SWITCH}$) equals P$_{HI}$ and the pressure in the spring charger assembly retraction chamber 157 is also equal to P$_{HI}$, the force against the larger top spring charger assembly face 142 exceeds that against the smaller bottom spring charger assembly face 158, and thus the spring charger assembly 153 is in a non-equilibrium state as shown in FIG. 1(*e*). Once the spring charger assembly 153 moves into extension, the apparatus returns to Step 1.a.

To summarize, actuation of the valve 114 initiates motion of the poppet valve 159: when the valve 114 is in the position illustrated in FIGS. 1(*a*), (*d*), and (*e*), the poppet valve 159 moves toward (or is at) the closed position, and when the valve 114 is in the position illustrated in FIGS. 1(*b*) and (*c*), the poppet valve 159 moves toward (or is at) the open position. At the two periods where the position of the poppet valve 159 is fixed (when the poppet valve 159 is fully open and when the poppet valve 159 is fully closed/seated), make-up energy to account for friction and other losses is added to the springs 143 and 154 by supplying hydraulic fluid to the proper end of the spring charger assembly 153 so that it moves with respect to the poppet valve 159. When this energy is added, the poppet valve 159 is secured against motion by a one-way clutch, i.e., the sprags 108. The sprags 108 are engaged (or disengaged) by toggles provided on the latching piston 107. Both the spring charger assembly 153 and the latching piston 107 utilize double-acting pistons with differently-sized acting surfaces (i.e., the piston ends are differently sized).

Note that in a conventional engine design, the valve seating force comes from the valve springs. In the foregoing actuator 100, when the poppet valve 159 is in its closed/seated position, the springs are actually attempting to open the valve. However, the sprags 108 (or whatever other form of latch is provided) maintain the poppet valve 159 in its closed state.

It is noted that the sprags 108 are illustrated in rudimentary form in the Figures, with well-defined corners shown on their structures so that the changing positions of the sprags 108 are more evident in successive drawings. In practice, the sprags 108 would generally have smoother, more continuous surfaces typical of common sprags. It is also noted that engagement and release of the sprags 108 is possible with only a very small motion of the latching piston 107, and that the latching piston 107 of the Figures is shown with a relatively large range of motion so that its action is more evident between successive drawings.

2. Second Embodiment: Use of Hydraulic Force For Improved Valve Seating

Figure 2A:
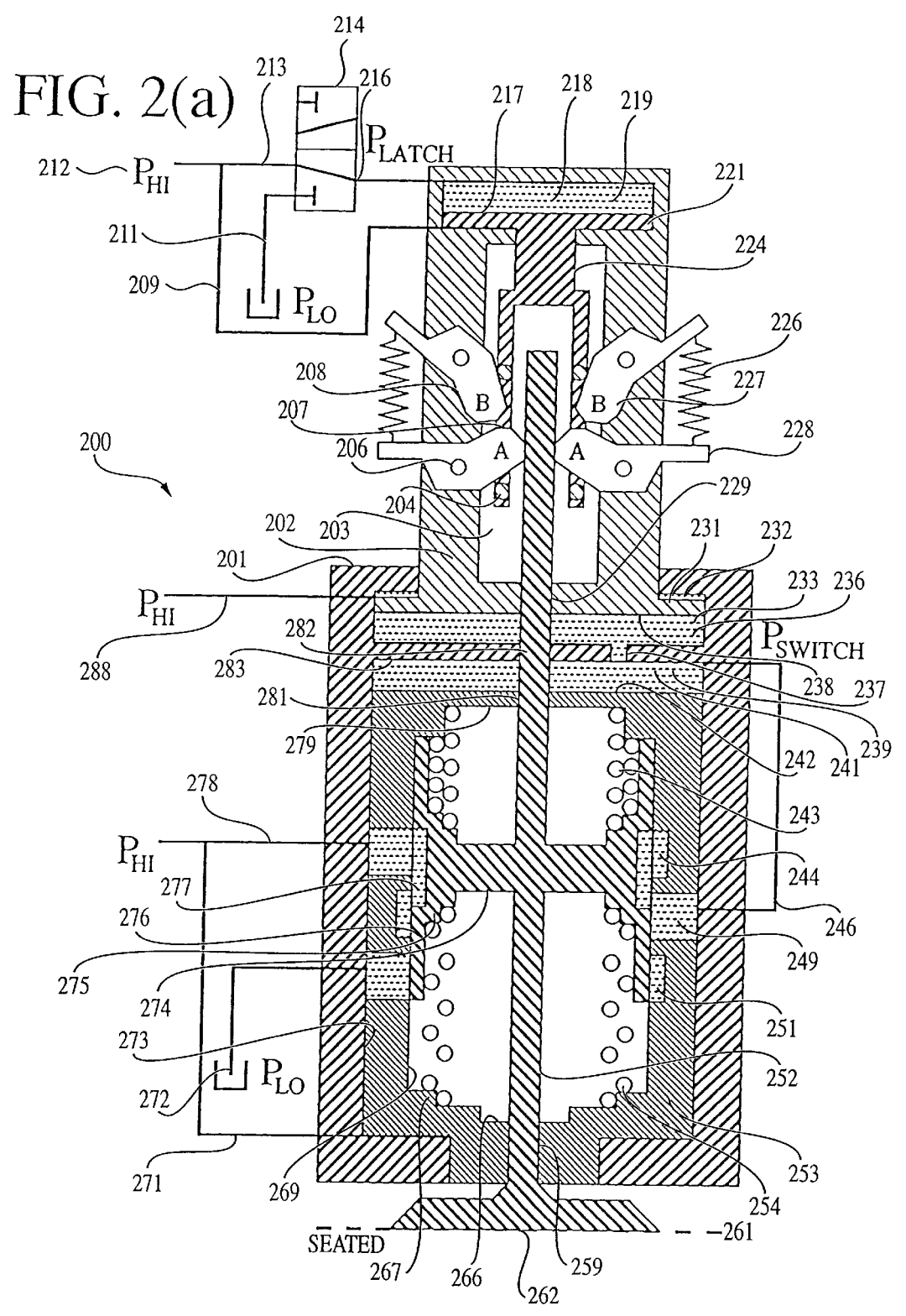

With reference to FIGS. 2(a)–2(e), and particularly to FIG. 2(a), a second variable valve timing actuator embodiment is designated generally by the reference numeral 200. The variable valve timing actuator 200 includes a housing 201 fixed with respect to the cylinder head. Inside the housing 201, a housing spring charger assembly chamber 241 and a latching piston assembly chamber 233 are defined within its interior. A poppet valve 259 is movable within the housing 201 so that it may reciprocate through the housing spring charger assembly chamber 241 and latching piston assembly chamber 233. The poppet valve 259 is also slidable within a spring charger assembly 253, which may be displaced by fluid pressure within the housing spring charger assembly chamber 241, and within a latching piston assembly 202, which may similarly be displaced by fluid pressure within the latching piston assembly chamber 233. The spring charger assembly 253 contains concentric upper springs 243 and lower springs 254 which bear against the poppet valve 259. Within the latching piston assembly 202, a latching piston output chamber 203 and a latching piston input chamber 218 are provided wherein a latching piston 207 reciprocates. The poppet valve 259 moves within the latching piston output chamber 203, wherein latches (latching sprags) 208 pivotally mounted to the latching piston assembly 202 may selectively engage the poppet valve 259 to act as one-way clutches. The latching sprags 208 are actuated by the latching piston 207, which is positioned by fluid pressure within the latching piston input chamber 218 to move within the latching piston output chamber 203 of the latching piston assembly 202. As will be better realized from the following more detailed discussion of these components and their interaction, the variable valve timing actuator 200 operates similarly to the actuator 100 discussed previously: actuation of the latching piston 207 to appropriate positions enables the poppet valve 259 to move between its fully open (fully extended) and fully closed (fully retracted) positions, and kinetic energy of the poppet valve 259 is converted into potential energy of the springs 243 and 254 (and vice versa) at appropriate times to reduce the overall energy input required for actuation of the poppet valve 259. As will be discussed later in this document, the variable valve timing actuator 200 may have improved seating of the poppet valve 259 owing to the upward (retracting) motion of the latching piston assembly 202 when the poppet valve 259 is closing.

The poppet valve 259 includes an elongated poppet valve stem 252 extending from a poppet valve head 262. The poppet valve stem 252 extends from within the latching piston output chamber 203 of the latching piston assembly 202, through a latching piston assembly bore 229 and into the latching piston assembly chamber 233, through a housing valve bore 282 in the housing 201 and into the housing spring charger assembly chamber 241, and then through a central spring charger assembly bore 281 in the spring charger assembly 253. As a result, the poppet valve 259 may move with respect to the housing 201, the latching piston assembly 202 (and the latching piston 207), and the spring charger assembly 253, as shown by the various FIGS. 2(a)–2(e). The dashed line 261 near the poppet valve head 262, which is also labeled "seated", is used to illustrate the position at which the face of the poppet valve head 262 is located when the poppet valve 259 is fully seated (with the seat structure not being illustrated in the Figures). As can be seen by comparing the various FIGS. 2(a)–1(e), the poppet valve 259 is capable of moving between the seated (fully closed) valve position indicated by the dashed line 261 in FIGS. 2(a) and (e) to the fully open position illustrated in FIG. 2(c).

The poppet valve stem 252 includes a poppet valve spool arm 274 extending radially outwardly to terminate at a poppet valve switching spool 276 having a poppet valve switching spool cavity 277 defined therein. The poppet valve switching spool 276 is closely situated against the circumferential interior spring charger assembly wall 269 so that it may slide against the interior wall 269 in fluid-tight engagement. Thus, the poppet valve switching spool 276 and poppet valve switching spool cavity 277 are repositioned along the circumferential interior spring charger assembly wall 269 as the poppet valve 259 and spring charger assembly 253 move, as can be seen from FIGS. 2(a)–2(e). The poppet valve spool arm 274 bears spring seats 275 against which the springs 243 and 254 are seated, with upper springs 243 being engaged between the upper interior spring charger assembly walls 279 and spring seats 275 on the poppet valve spool arm 274, and lower springs 254 being engaged between the lower interior spring charger assembly walls 266 and spring seats 275 on the poppet valve spool arm 274.

Within the housing spring charger assembly chamber 241, the spring charger assembly 253 is configured to closely engage and slide against the circumferential interior housing chamber wall 273, and between the upper and lower interior housing chamber walls 283 and 268, in fluid-tight relationship. The housing spring charger assembly chamber 241 is thus partially occupied by the spring charger assembly 253, with its remainder being defined by one or more of a spring charger assembly extension chamber 239 and a spring charger assembly retraction chamber 257. The spring charger assembly extension chamber 239—which is visible in FIGS. 2(a) and 2(b), but not in FIGS. 2(c)–2(e)—is defined between a larger top spring charger assembly face 242 located at the top of the spring charger assembly 253, the top and circumferential walls of the housing spring charger assembly chamber 241, and the poppet valve stem 252. The spring charger assembly retraction chamber 257—which is visible in FIGS. 2(c)–2(e), but not in FIGS. 2(a) and 2(b)—is defined between a smaller bottom spring charger assembly face 258 located at the bottom of the spring charger assembly 253, and the bottom and circumferential walls of the housing spring charger assembly chamber 241. As can be seen from a comparison of FIGS. 2(a) and 2(b) versus FIGS. 2(c)–(e), when the spring charger assembly 253 moves downward (into its extended position), the spring charger assembly extension chamber 239 grows in volume while the volume of the spring charger assembly retraction chamber 257 is reduced. Similarly, it can be seen from the same Figures that when the spring charger assembly 253 moves upward (into its retracted position), the spring charger assembly retraction chamber 257 grows in volume while the spring charger assembly extension chamber 239 is reduced. Since the spring charger assembly 253 has a larger spring charger assembly face 242 adjacent the spring charger assembly extension chamber 239 and a smaller spring charger assembly face 258 adjacent the spring charger assembly retraction chamber 257, it is evident that the same pressure within the chambers 239 and 257 will generate a net acting force on the larger spring charger assembly face 242, causing the spring charger assembly 253 to move downward (into its extended position).

The latching piston assembly 202 then includes a similar feature within the latching piston assembly chamber 233, wherein the latching piston assembly chamber 233 may be regarded as including a smaller latching piston assembly chamber 232 adjacent a smaller latching piston assembly face 231 and a larger latching piston assembly chamber 236 adjacent a larger latching piston assembly face 238. Thus, the same pressure within the larger latching piston assembly chamber 236 and smaller latching piston assembly chamber 232 will generate a net acting force on the larger latching piston assembly face 238, causing the latching piston assembly 238 to move upward (into a retracted position). The larger latching piston assembly chamber 236 is connected to the spring charger assembly extension chamber 239 via a bridging passage 237, thereby making their fluid pressures equal.

The sprags 208, which act as one-way clutches for restraining the poppet valve 259 from motion in undesired directions, each include a sprag tail 228, an opposing sprag head 227 which may engage and disengage the poppet valve stem 252, and an intermediate sprag pivot point 206 which is fixed with respect to the latching piston assembly 202 and about which the sprag tail 228 and head 227 may rotate. Two coacting pairs of latching sprags 208 are illustrated, with one pair being designated by the reference character A in the Figures and the other pair being designated by the reference character B. The sprag pair A prevents downward motion of the poppet valve 259 (towards a more open state) when its sprag heads 227 engage the poppet valve stem 252, but it allows upward motion of the poppet valve 259 (towards a closed state). Conversely, the sprag pair B prevents upward motion of the poppet valve 259 (towards a more closed state) when its sprag heads 227 engage the poppet valve stem 252, but it allows downward motion of the poppet valve 259 (towards an open state). Sprag springs 226 connect the sprag tails 228 between the sprag sets A and B so as to assist the engagement of one of the sprag sets A or B against the poppet valve stem 252 when the other is disengaged.

The latching piston 207 includes a latching piston input end 221 which is actuated by fluid pressure within the latching piston input chamber 218, and a latching piston output end 224 which moves within the latching piston output chamber 203 to actuate the sprags 208. The latching piston input end 221 is configured as a double-acting piston having a larger latching piston face 217 and a smaller latching piston face 222. The latching piston output end 224 has an annular or bifurcated configuration which allows it to reciprocate coaxially about the valve stem 252 and actuate the sprags 208, as will be discussed at greater length below.

Figure 2E:
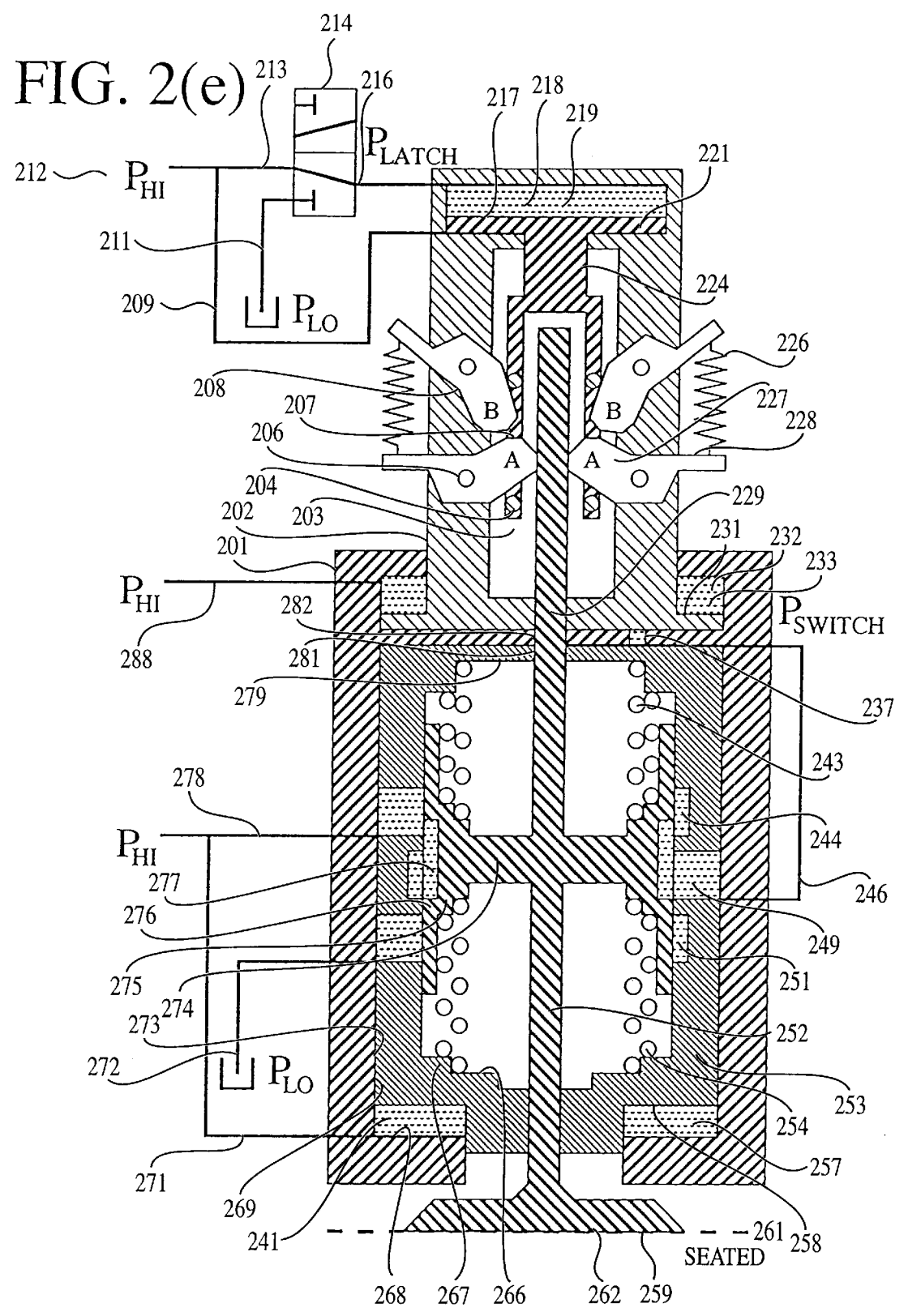

The latching piston output end 224 bears toggles 204 which bear against the sprags 208 to move the sprag sets A and B between the engaged and disengaged positions. As can be seen in FIGS. 2(a), 2(d), and 2(e), when the latching piston 207 is extended (moved downward), the toggles 204 disengage the sprag set B, thereby engaging sprag set A owing to the force of the sprag springs 226. Similarly, as can be seen from FIGS. 2(b) and 2(c), when the latching piston 207 is retracted (moved upward), the toggles 204 disengage sprag set A from the poppet valve stem 252 and the sprag springs 226 thereby engage sprag set B.

Fluid conduits are then provided in conjunction with the latching piston input chamber 218 to allow the latching piston input end 221 (and thus the latching piston 207 in general) to be hydraulically actuated. Initially, a pair of high pressure lines 213 and 209 lead from a high pressure fluid source 212 (having a pressure designated $P_{HI}$). One high pressure line 209 is in permanent connection with a latching piston retraction chamber 223 adjacent the smaller latching piston face 222 of the latching piston input end 221. The other high pressure line 213 leads to a three-way, two-position valve 214 which is selectively connectable to a latching line 216—the latching line 216 having its pressure designated $P_{LATCH}$—which leads to a latching piston extension chamber 219 adjacent the larger latching piston face 217 of the latching piston input end 221. The valve 214 may also connect a low pressure line 211—having a pressure designated $P_{LO}$—to the latching line 216, thereby setting $P_{LATCH}$ equal to $P_{LO}$.

It can be seen that when the valve 214 is adjusted to set $P_{LATCH}$ equal to $P_{HI}$, as in FIGS. 2(a), 2(d), and 2(e), equal (high) fluid pressure is exerted on both the larger latching piston face 217 and the smaller latching piston face 222 of the latching piston input end 221. As a result, greater force is exerted on the larger latching piston face 217 and the latching piston 207 will move downward into its extended position, wherein sprag set B is disengaged and sprag set A is engaged. On the other hand, when the valve 214 is moved as in FIGS. 2(b) and 2(c) to set $P_{LATCH}$ equal to $P_{LO}$, low pressure is exerted on the larger latching piston face 217 of the latching piston input end 221 and high pressure is exerted on the smaller latching piston face 222. The latching piston 207 therefore moves upward into its retracted position, wherein sprag set A is disengaged and sprag set B is engaged.

Fluid conduits are also provided to the latching piston assembly chamber 233 (more specifically, to its smaller latching piston assembly chamber 232), the housing spring charger assembly chamber 241 (more specifically, to its spring charger assembly extension chamber 239 and spring charger assembly retraction chamber 257), and to the circumferential interior housing wall 273 (where fluid may be conveyed in turn to the circumferential interior spring charger assembly wall 269 adjacent the poppet valve switching spool 276). These provide a switching arrangement for providing the springs 243 and 254 with potential energy, and also actuate the latching piston assembly 202 to extend or retract, thereby assisting in opening and closing the poppet valve 259. Initially, high pressure lines 278 and 271—whose pressure is designated by $P_{HI}$—extend (1) through the housing 201 to a high pressure spring charger assembly switching cavity 244 defined on the circumferential interior spring charger assembly wall 269 adjacent the poppet valve switching spool 276 of the poppet valve 259; and (2) to the spring charger assembly retraction chamber 257 situated adjacent the smaller bottom spring charger assembly face 258, this chamber 257 only being fully shown in FIGS. 2(c)–2(e). A high pressure line 288 also extends through the housing 201 to the latching piston assembly chamber 233 at its smaller latching piston assembly chamber 232. A low pressure line 272—whose pressure is designated $P_{LO}$—then extends through the housing 201 to a low pressure spring charger assembly switching cavity 251 defined on the circumferential interior spring charger assembly wall 269 adjacent the poppet valve switching spool 276 of the poppet valve 259. A switching line 246—having a variable pressure designated $P_{SWITCH}$—then leads between the spring charger assembly extension chamber 239 situated adjacent to the larger top spring charger assembly face 242, and a bridge cavity 249 defined about the circumferential interior spring charger assembly wall 269 adjacent to the poppet valve switching spool 276. Depending on the location of the poppet valve switching spool 276 with respect to the bridge cavity 249 on the poppet valve switching spool 276, the poppet valve switching spool cavity 277 may connect the high pressure spring charger assembly switching cavity 244 to the switching line 246, thereby setting P$_{SWITCH}$ equal to P$_{HI}$ (as in FIGS. 2(a) and 2(b)), or it may connect the low pressure spring charger assembly switching cavity 251 to the switching line 246, thereby setting P$_{SWITCH}$ equal to P$_{LO}$ (as in FIGS. 2(c) and 2(d)). When P$_{SWITCH}$ is equal to P$_{HI}$, high pressure is exerted on the larger top spring charger assembly face 242, the smaller bottom spring charger assembly face 258, and to the larger latching piston assembly face 238 (with the smaller latching piston assembly face 231 already being subjected to P$_{HI}$ from high pressure line 288). Net force is thus exerted on the larger top spring charger assembly face 242, moving the spring charger assembly 253 downward into its extended position; additionally, net force is exerted on the larger latching piston assembly face 238, moving the latching piston assembly 233 upward into its retracted position. On the other hand, when the poppet valve 259 is extended to such an extent that the poppet valve switching spool cavity 277 connects the bridge cavity 249 and the low pressure spring charger assembly switching cavity 251 P$_{SWITCH}$ will be set equal to P$_{LO}$, thereby allowing the high pressure fluid adjacent the smaller bottom spring charger assembly face 258 and the smaller latching piston assembly face 231 to generate sufficient force that the spring charger assembly 253 is moved upward into its retracted position, and the latching piston assembly 202 is moved downward into its extended position.

An operational cycle of the variable valve timing actuator 200 can then be summarized as follows:

Step 2.(a): Poppet Fully Closed (FIG. 2(a))

The latching line 216 is connected to the high pressure line 213, thereby setting P$_{LATCH}$ equal to P$_{HI}$. As a result, the latching piston 207 is extended towards the poppet valve 259, thereby:

Engaging the lower sprag set A, preventing downward motion of the poppet valve 259 towards the open state.

Disengaging the upper sprag set B, allowing upward motion of the poppet valve 259 towards the closed state.

The poppet valve 259 is therefore latched in the closed state against the poppet valve seat (not shown) by the lower sprag set A.

Additionally, the switching line 246 is in fluid communication with the high pressure line 278, thereby setting P$_{SWITCH}$ equal to P$_{HI}$. As a result:

The spring charger assembly 253 is therefore in the extended position (closer to the poppet valve head 262), compressing the upper springs 243 and providing the poppet valve 259 with potential energy. The upper springs 243 are therefore prepared to urge the poppet valve 259 towards the open state (converting the potential energy of the springs 243 into kinetic energy of the opening poppet valve 259) once the sprags 208 allow it.

The latching piston assembly 202 is urged towards a retracted position distant from the poppet valve head 262, thereby further urging the poppet valve 259 into the closed state.

Step 2.(a).1: Just Before Poppet Begins Opening (Not Shown in Drawings)

The latching line 216 is connected to the low pressure line 211, thereby setting P$_{LATCH}$ equal to P$_{LO}$. As a result, the latching piston 207 is retracted away from the poppet valve 259, thereby:

Disengaging the lower sprag set A, allowing downward motion of the poppet valve 259 towards the open state.

Engaging the upper sprag set B, preventing upward motion of the poppet valve 259 towards the closed state.

The poppet valve 259 is therefore urged towards the open state owing to the potential energy of the compressed upper springs 243.

The switching line 246 is in fluid communication with the high pressure line 278, thereby setting P$_{SWITCH}$ equal to P$_{HI}$ so that:

The spring charger assembly 253 is in the extended position (closer to the poppet valve head 262), and The latching piston assembly 202 is urged towards a retracted position distant from the poppet valve head 262.

Step 2.(b): Poppet Opening (FIG. 2(b))

The latching line 216 is connected to the low pressure line 211, thereby setting P$_{LATCH}$ equal to P$_{LO}$. As a result, the latching piston 207 is retracted away from the poppet valve 259, thereby:

Disengaging the lower sprag set A, allowing downward motion of the poppet valve 259 towards the open state.

Engaging the upper sprag set B, preventing upward motion of the poppet valve 259 towards the closed state.

The poppet valve 259 is therefore urged towards the open state owing to the potential energy of the compressed upper springs 243, and is shown halfway open.

P$_{SWITCH}$ is in transition from P$_{HI}$ to P$_{LO}$ owing to the motion of the poppet valve 259 (more specifically, owing to the movement of the poppet valve switching spool cavity 277 towards a position connecting the bridge cavity 249 to the low pressure spring charger assembly switching cavity 251).

Step 2.(c): Poppet Fully Opened (FIG. 2(c))

The latching line 216 is connected to the low pressure line 211, thereby setting P$_{LATCH}$ equal to P$_{LO}$. As a result, the latching piston 207 is retracted away from the poppet valve 259, thereby:

Disengaging the lower sprag set A, allowing downward motion of the poppet valve 259 towards the open state.

Engaging the upper sprag set B, preventing upward motion of the poppet valve 259 towards the closed state.

With the potential energy in the upper springs 243 being expended, the poppet valve 259 is latched in the open state away from the poppet valve seat (not shown) by the upper sprag set B.

The switching line 246 is in fluid communication with the low pressure line 272, thereby setting P$_{SWITCH}$ equal to P$_{LO}$ so that:

The spring charger assembly 253 is moved to the retracted position distant from the poppet valve head 262, adding to the compression of the lower springs 254 and thereby adding potential energy for the later closing of the poppet valve 259.

The latching piston assembly 202 is urged towards an extended position closer to the poppet valve head 262, thereby further urging the poppet valve 259 into the open state.

Step 2.(c).1: Just Before Poppet Begins Closing (Not Shown in Drawings)

The latching line 216 is connected to the high pressure line 213, thereby setting P$_{LATCH}$ equal to P$_{HI}$. As a result, the latching piston 207 is extended towards the poppet valve 259, thereby:

Engaging the lower sprag set A, preventing downward motion of the poppet valve 259 towards the open state.

Disengaging the upper sprag set B, allowing upward motion of the poppet valve 259 towards the closed state.

The poppet valve 259 is therefore urged towards the closed state owing to the potential energy of the compressed lower springs 254.

The switching line 246 is in fluid communication with the low pressure line 272, thereby setting P$_{SWITCH}$ equal to P$_{LO}$ so that:

The spring charger assembly 253 is moved to the retracted position distant from the poppet valve head 262, and The latching piston assembly 202 is urged towards an extended position closer to the poppet valve head 262.

Step 2.(d): Poppet Closing (FIG. 2(d))

The latching line 216 is connected to the high pressure line 213, thereby setting P$_{LATCH}$ equal to P$_{HI}$. As a result, the latching piston 207 is extended towards the poppet valve 259, thereby:

Engaging the lower sprag set A, preventing downward motion of the poppet valve 259 towards the open state.

Disengaging the upper sprag set B, allowing upward motion of the poppet valve 259 towards the closed state.

The poppet valve 259 is therefore urged towards the closed state owing to the potential energy of the compressed lower springs 254, and is shown halfway closed.

P$_{SWITCH}$ is in transition from P$_{LO}$ to P$_{HI}$ owing to the motion of the poppet valve 259 (more specifically, owing to the movement of the poppet valve switching spool cavity 277 towards a position connecting the bridge cavity 249 to the high pressure spring charger assembly switching cavity 244).

Step 2.(e): Poppet Fully Closed (FIG. 2(e))

The latching line 216 is connected to the high pressure line 213, thereby setting P$_{LATCH}$ equal to P$_{HI}$. As a result, the latching piston 207 is extended towards the poppet valve 259, thereby:

Engaging the lower sprag set A, preventing downward motion of the poppet valve 259 towards the open state.

Disengaging the upper sprag set B, allowing upward motion of the poppet valve 259 towards the closed state.

The poppet valve 259 is therefore latched in the closed state against the poppet valve seat (not shown) by the lower sprag set A.

Additionally, the switching line 246 is in fluid communication with the high pressure line 278, thereby setting P$_{SWITCH}$ equal to P$_{HI}$ so that:

The spring charger assembly 253 is about to move to the extended position (closer to the poppet valve head 262). It is important to note that FIG. 2(e) shows the spring charger assembly 253 in this state: since the pressure in the spring charger assembly extension chamber 239 (P$_{SWITCH}$) equals P$_{HI}$ and the pressure in the spring charger assembly retraction chamber 257 is also equal to P$_{HI}$, the force against the larger top spring charger assembly face 242 exceeds that against the smaller bottom spring charger assembly face 258, and thus the spring charger assembly 253 is in a non-equilibrium state as shown in FIG. 2(e).

The latching piston assembly 202 is urged towards a retracted position distant from the poppet valve head 262.

Once the spring charger assembly 253 moves into extension and the latching piston assembly 202 retracts, the apparatus returns to Step 2.a.

To summarize, in the actuator 200, the latching piston 207 and sprags 208 are situated in a hydraulically-actuated latching piston assembly 202. When the poppet valve 259 is seated and hydraulic fluid is ported to the top of the spring charger assembly 253, the hydraulic fluid is also ported to the bottom of the latching piston assembly 202. This provides an upward force (which must be greater than the net force in springs 243 and 254) which will hold the poppet valve 259 tightly against its seat. When the poppet valve 259 is fully open, the net hydraulic force on the latching piston assembly 202 is downward, causing it to move to its extended position. Note that in conjunction with the bridging passage 237, the double-acting piston arrangements of the latching piston assembly 202 and spring charger assembly 253 cause them to move in opposite directions within the housing 201.

As a result of the foregoing arrangement, the actuator 200 (as well as subsequent embodiments discussed in the following pages) may have performance superior to that of the actuator 100 of FIG. 1 insofar as it reduces or eliminates the possibility of valve leakage due to incomplete seating. Since the actuator 100 does not have any means of positively ensuring that the poppet valve 159 stays fully seated when closed, a small clearance between the poppet valve 159 and its seat could lower engine efficiency owing to gas leakage, and could also lead to a "burned valve."

3. Third Embodiment: Addition of Energy Via Latching Piston Assembly

Figure 3A:
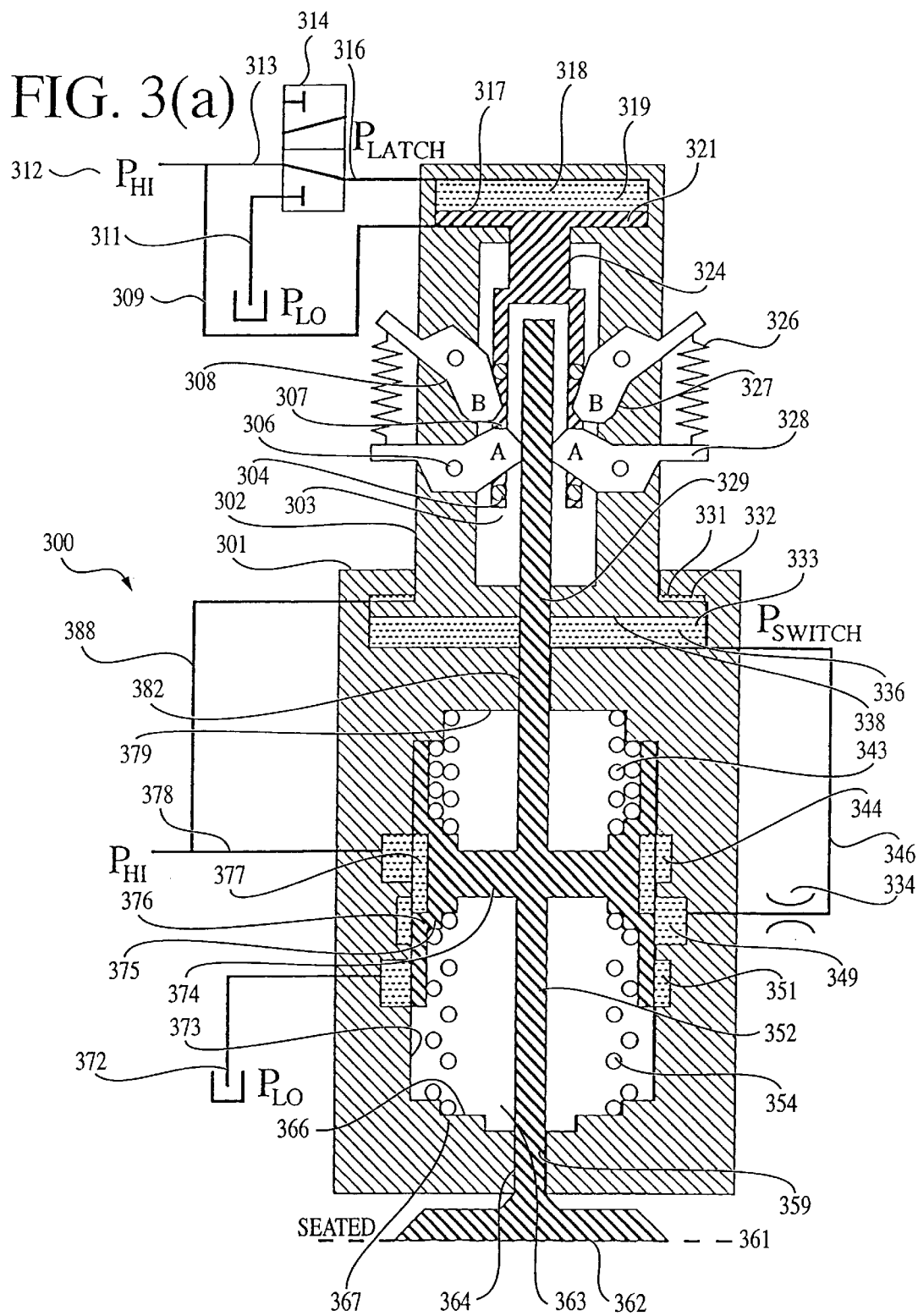
FIG. 3(a) is a side elevation view of a cross-section of a third preferred embodiment of a variable valve timing actuator in accordance with the invention, shown with its poppet valve situated in the seated/closed position.

With reference to FIGS. 3(a)–3(d), and particularly to FIG. 3(a), a third variable valve timing actuator embodiment is designated generally by the reference numeral 300. The variable valve timing actuator 300 includes a housing 301 wherein a switching chamber 363 and a latching piston assembly chamber 333 are defined within its interior. A poppet valve 359 is movable within the housing 301 so that it may reciprocate through the switching chamber 363 and latching piston assembly chamber 333. The poppet valve 359 is also slidable within a latching piston assembly 302, which may be displaced by fluid pressure within the latching piston assembly chamber 333. The housing 301 contains concentric upper springs 343 and lower springs 354 which bear against the poppet valve 359. Within the latching piston assembly 302, a latching piston output chamber 303 and a latching piston input chamber 318 are provided wherein a latching piston 307 reciprocates. The poppet valve 359 moves within the latching piston output chamber 303, wherein latches (latching sprags) 308y pivotally mounted to the latching piston assembly 302 may selectively engage the poppet valve 359 to act as one-way clutches. The latching sprags 308 are actuated by the latching piston 307, which is positioned by fluid pressure within the latching piston input chamber 318 to move within the latching piston output chamber 303 of the latching piston assembly 302. As will now be discussed, the variable valve timing actuator 300 is similar to the previously-discussed actuators 200 and 100, but the spring charger assembly is omitted and the latching piston assembly 302 is used to add the make-up energy necessary to overcome the actuator's friction.

The poppet valve 359 includes an elongated poppet valve stem 352 extending from a poppet valve head 362. The poppet valve stem 352 extends from within the latching piston output chamber 303 of the latching piston assembly 302, through a latching piston assembly bore 329 and into the latching piston assembly chamber 333, through a housing valve entry bore 382 in the housing 301 and into the switching chamber 363, and then through a housing valve exit bore 364 in the housing 301. As a result, the poppet valve 359 may move with respect to the housing 301, the latching piston assembly 302 (and the latching piston 307), as shown by the various FIGS. 3(a)–3(d). The dashed line 361 near the poppet valve head 362, which is also labeled "seated", is used to illustrate the position at which the face of the poppet valve head 362 is located when the poppet valve 359 is fully seated (with the seat structure not being illustrated in the Figures). As can be seen by comparing the various FIGS. 3(a)–3(d), the poppet valve 359 is capable of moving between the seated (fully closed) valve position indicated by the dashed line 361 in FIGS. 3(a) and (d) to the fully open position illustrated in FIG. 3(c).

The poppet valve stem 352 includes a poppet valve spool arm 374 extending radially outwardly to terminate at a poppet valve switching spool 376 having a poppet valve switching spool cavity 377 defined therein. The poppet valve switching spool 376 is closely situated against the circumferential interior housing wall 373 so that it may slide against the housing wall 373 in fluid-tight engagement. Thus, the poppet valve switching spool 376 and poppet valve switching spool cavity 377 are repositioned along the circumferential interior housing wall 373 as the poppet valve 359 and housing 301 move, as can be seen from FIGS. 3(a)–3(d). The poppet valve spool arm 374 bears spring seats 375 against which the springs 343 and 354 are seated, with upper springs 343 being engaged between the upper interior switching chamber walls 379 and spring seats 375 on the poppet valve spool arm 374, and lower springs 354 being engaged between the lower interior switching chamber walls 366 and spring seats 375 on the poppet valve spool arm 374.

The latching piston assembly chamber 333 may be regarded as including a smaller latching piston assembly chamber 332 adjacent a smaller latching piston assembly face 331, and a larger latching piston assembly chamber 336 adjacent a larger latching piston assembly face 338. Thus, the same pressure within the larger latching piston assembly chamber 336 and smaller latching piston assembly chamber 332 will generate a net acting force on the larger latching piston assembly face 338, causing the latching piston assembly 338 to move upward (into a retracted position).

The sprags 308, which act as one-way clutches for restraining the poppet valve 359 from motion in undesired directions, each include a sprag tail 328, an opposing sprag head 327 which may engage and disengage the poppet valve stem 352, and an intermediate sprag pivot point 306 which is fixed with respect to the latching piston assembly 302 and about which the sprag tail 328 and head 327 may rotate. Two co-acting pairs of latching sprags 308 are illustrated, with one pair being designated by the reference character A in the Figures and the other pair being designated by the reference character B. The sprag pair A prevents downward motion of the poppet valve 359 (towards a more open state) when its sprag heads 327 engage the poppet valve stem 352, but it allows upward motion of the poppet valve 359 (towards a closed state). Conversely, the sprag pair B prevents upward motion of the poppet valve 359 (towards a more closed state) when its sprag heads 327 engage the poppet valve stem 352, but it allows downward motion of the poppet valve 359 (towards an open state). Sprag springs 326 connect the sprag tails 328 between the sprag sets A and B so as to assist the engagement of one of the sprag sets A or B against the poppet valve stem 352 when the other is disengaged.

The latching piston 307 includes a latching piston input end 321 which is actuated by fluid pressure within the latching piston input chamber 318, and a latching piston output end 324 which moves within the latching piston output chamber 303 to actuate the sprags 308. The latching piston input end 321 is configured as a double-acting piston having a larger latching piston face 317 and a smaller latching piston face 322. The latching piston output end 324 has an annular or bifurcated configuration which allows it to reciprocate coaxially about the valve stem 352 and actuate the sprags 308, as will be discussed at greater length below.

The latching piston output end 324 bears toggles 304 which bear against the sprags 308 to move the sprag sets A and B between the engaged and disengaged positions. As can be seen in FIGS. 3(a) and 3(d), when the latching piston 307 is extended (moved downward), the toggles 304 disengage the sprag set B, thereby engaging sprag set A owing to the force of the sprag springs 326. Similarly, as can be seen from FIGS. 3(b) and 3(c), when the latching piston 307 is retracted (moved upward), the toggles 304 disengage sprag set A from the poppet valve stem 352 and the sprag springs 326 thereby engage sprag set B.

Fluid conduits are then provided in conjunction with the latching piston input chamber 318 to allow the latching piston input end 321 (and thus the latching piston 307 in general) to be hydraulically actuated. Initially, a pair of high pressure lines 313 and 309 lead from a high pressure fluid source 312 (having a pressure designated $P_{HI}$). One high pressure line 309 is in permanent connection with a latching piston retraction chamber 323 adjacent the smaller latching piston face 322 of the latching piston input end 321. The other high pressure line 313 leads to a three-way, two-position valve 314 which is selectively connectable to a latching line 316—the latching line 316 having its pressure designated $P_{LATCH}$—which leads to a latching piston extension chamber 319 adjacent the larger latching piston face 317 of the latching piston input end 321. The valve 314 may also connect a low pressure line 311—having a pressure designated $P_{LO}$—to the latching line 316, thereby setting $P_{LATCH}$ equal to $P_{LO}$.

It can be seen that when the valve 314 is adjusted to set $P_{LATCH}$ equal to $P_{HI}$, as in FIGS. 3(a) and 3(d), equal (high) fluid pressure is exerted on both the larger latching piston face 317 and the smaller latching piston face 322 of the latching piston input end 321. As a result, greater force is exerted on the larger latching piston face 317 and the latching piston 307 will move downward into its extended position, wherein sprag set B is disengaged and sprag set A is engaged. On the other hand, when the valve 314 is moved as in FIGS. 3(b) and 3(c) to set $P_{LATCH}$ equal to $P_{LO}$, low pressure is exerted on the larger latching piston face 317 of the latching piston input end 321 and high pressure is exerted on the smaller latching piston face 322. The latching piston 307 therefore moves upward into its retracted position, wherein sprag set A is disengaged and sprag set B is engaged.

Fluid conduits are also provided to the latching piston assembly chamber 333 and to the circumferential interior housing wall 373 adjacent the poppet valve switching spool 376. Initially, a high pressure line 378—whose pressure is designated by $P_{HI}$—extends through the housing 301 to a high pressure housing switching cavity 344 defined on the circumferential interior housing wall 373 adjacent the poppet valve switching spool 376 of the poppet valve 359. A high pressure line 372 also extends through the housing 301 to the latching piston assembly chamber 333 at its smaller latching piston assembly chamber 332. A low pressure line 372—whose pressure is designated $P_{LO}$—then extends through the housing 301 to a low pressure housing switching cavity 351 defined on the circumferential interior housing wall 373 adjacent the poppet valve switching spool 376 of the poppet valve 359. A switching line 346—having a variable pressure designated P$_{SWITCH}$—then leads between the larger latching piston assembly chamber 336 and a bridge cavity 349 defined about the circumferential interior housing wall 373 adjacent to the poppet valve switching spool 376. An orifice 334, the purpose of which will be described at greater length later, is then provided on the switching line 346. Depending on the location of the poppet valve switching spool 376 with respect to the bridge cavity 349 on the poppet valve switching spool 376, the poppet valve switching spool cavity 377 may connect the high pressure housing switching cavity 344 to the switching line 346, thereby setting P$_{SWITCH}$ equal to P$_{HI}$ (as in FIGS. 3(a), 3(b), and 3(d)), or it may connect the low pressure housing switching cavity 351 to the switching line 346, thereby setting P$_{SWITCH}$ equal to P$_{LO}$ (as in FIG. 3(c)). When P$_{SWITCH}$ is equal to P$_{HI}$, high pressure is exerted on the larger latching piston assembly face 338 (with the smaller latching piston assembly face 331 already being subjected to P$_{HI}$ from high pressure line 372). Net force is thus exerted on the larger latching piston assembly face 338, moving the latching piston assembly 333 upward into its retracted position. On the other hand, when the poppet valve 359 is extended to such an extent that the poppet valve switching spool cavity 377 connects the bridge cavity 349 and the low pressure housing switching cavity 351, P$_{SWITCH}$ will be set equal to P$_{LO}$, thereby allowing the high pressure fluid adjacent the smaller latching piston assembly face 331 to generate sufficient force that the latching piston assembly 302 is moved downward into its extended position.

An operational cycle of the variable valve timing actuator 300 can then be summarized as follows:

Step 3.(a): Poppet Fully Closed (FIG. 3(a))

The latching line 316 is connected to the high pressure line 313, thereby setting P$_{LATCH}$ equal to P$_{HI}$. As a result, the latching piston 307 is extended towards the poppet valve 359, thereby:

Engaging the lower sprag set A, preventing downward motion of the poppet valve 359 towards the open state.

Disengaging the upper sprag set B, allowing upward motion of the poppet valve 359 towards the closed state.

The poppet valve 359 is therefore latched in the closed state against the poppet valve seat (not shown) by the lower sprag set A, and is prevented from moving downward.

Additionally, P$_{SWITCH}$ is connected to P$_{HI}$ so that the larger latching piston assembly chamber 336 is filled with high-pressure fluid, thereby moving the latching piston assembly 302 upward into a retracted position to maintain the poppet valve 359 in a closed state.

Step 3.(b): Poppet Opening (FIG. 3(b))

The latching line 316 is connected to the low pressure line 311, thereby setting P$_{LATCH}$ equal to P$_{LO}$. As a result, the latching piston 307 is retracted away from the poppet valve 359, thereby:

Disengaging the lower sprag set A, allowing downward motion of the poppet valve 359 towards the open state.

Engaging the upper sprag set B, preventing upward motion of the poppet valve 359 towards the closed state.

The poppet valve 359 is therefore urged towards the open state owing to the potential energy of the compressed upper springs 343, and is shown halfway open.

P$_{SWITCH}$ is in transition from P$_{HI}$ to P$_{LO}$ owing to the motion of the poppet valve 359 (more specifically, owing to the movement of the poppet valve switching spool cavity 377 towards a position connecting the bridge cavity 349 to the low pressure housing switching cavity 351). However, the latching piston assembly 302 still rests in its retracted position to maintain the poppet valve 359 in a closed state.

Step 3.(c): Poppet Fully Opened (FIG. 3(c))

The latching line 316 is connected to the low pressure line 311, thereby setting P$_{LATCH}$ equal to P$_{LO}$. As a result, the latching piston 307 is retracted away from the poppet valve 359, thereby:

Disengaging the lower sprag set A, allowing downward motion of the poppet valve 359 towards the open state.

Engaging the upper sprag set B, preventing upward motion of the poppet valve 359 towards the closed state.

With the potential energy in the upper springs 343 being expended, the poppet valve 359 is latched in the open state away from the poppet valve seat (not shown) by the upper sprag set B.

The switching line 346 is in fluid communication with the low pressure line 372, thereby setting P$_{SWITCH}$ equal to P$_{LO}$ so that the latching piston assembly 302 is urged towards an extended position closer to the poppet valve head 362. The poppet valve 359 is therefore further urged into the open state.

Step 3.(d): Poppet Closing (FIG. 3(d))

The latching line 316 is connected to the high pressure line 313, thereby setting P$_{LATCH}$ equal to P$_{HI}$. As a result, the latching piston 307 is extended towards the poppet valve 359, thereby:

Engaging the lower sprag set A, preventing downward motion of the poppet valve 359 towards the open state.

Disengaging the upper sprag set B, allowing upward motion of the poppet valve 359 towards the closed state.

The poppet valve 359 is therefore urged towards the closed state owing to the potential energy of the compressed lower springs 354, and is shown halfway closed.

P$_{SWITCH}$ is in transition from P$_{LO}$ to P$_{HI}$ due to the upward motion of the poppet (and is shown connected to P$_{HI}$ in FIG. 3(d)). It should be understood that once P$_{SWITCH}$ is connected to P$_{HI}$, the latching piston assembly 302 will be forced upward, thereby further urging the poppet valve 359 into the closed state; FIG. 3(d) illustrates the latching piston assembly 302 immediately prior to this motion.

This design eliminates the spring charger assemblys 153/253, providing both positive seating of the poppet valve 359 and energy addition to the springs 343 and 354 by motion of the latching piston assembly 302. When the poppet valve 359 is fully open, the latching piston assembly 302 will be moved to its fully extended (lowest) position. When the poppet valve 359 then closes, the latching piston assembly 359 will move upward by the amount necessary to firmly seat the poppet valve 359. Thus, with this design the opening of the poppet valve 359 has two components: the basic movement caused by the energy in the springs 343 and 354, and the small additional movement caused by motion of the latching piston assembly 302.

There may not always be exactly the same amount of energy added to the springs 343 and 354 when the poppet valve 359 is at its extreme (fully open and fully closed/seated) positions, but the actuator 300 should be self-adjusting. For example, if only minimal movement of the latching piston assembly 302 is required to seat the poppet valve 359, then virtually no energy is added to the springs 343 and 354. (Recall that the latching piston assembly 302 does not automatically retract upward to such an extent that it meets the housing 301; in fact, it should never quite reach the housing 301.) Then, when the poppet valve 359 next opens, its lift will be slightly less than nominal since insufficient energy was added to the springs 343/354 to make up for friction, etc., and also because the latching piston assembly 302 can (for most practical designs of the actuator 300) only move down a short distance. This small downward movement of the latching piston assembly 302 also means that only a small amount of energy can be added to the spring system 343/354. As a result, the poppet valve 359, when next closing, will initially tend to stop at a significant distance from the seat. The latching piston assembly 302 will therefore move upward (to seat the poppet valve 359) by a significantly greater distance than in the previous seating, adding more energy to the spring system 343/354. The poppet valve 359 will then have a greater lift during its next opening, and so on. It is believed that this self-adjustment will act in a stable manner to eliminate any adverse effects from variations in the forces that act on the poppet valve 359 (friction, gas loading, etc.). Also, in this actuator 300, the energy added in each cycle should on average be the exact amount required to overcome losses, since the latching piston assembly 302 will retract upward by whatever distance is necessary to fully seat the valve (though it is illustrated as fully traversing the latching piston assembly chamber 333 in the Figures). With the movable spring charger assemblys 153/253 of the first and second embodiments 100/200, the amount of energy added in each cycle is more dependent on the mechanical dimensions/ranges of motion of the various components, and in order to add a safety factor for unknowns, this would have to be greater than the actual losses.

Figure 4:
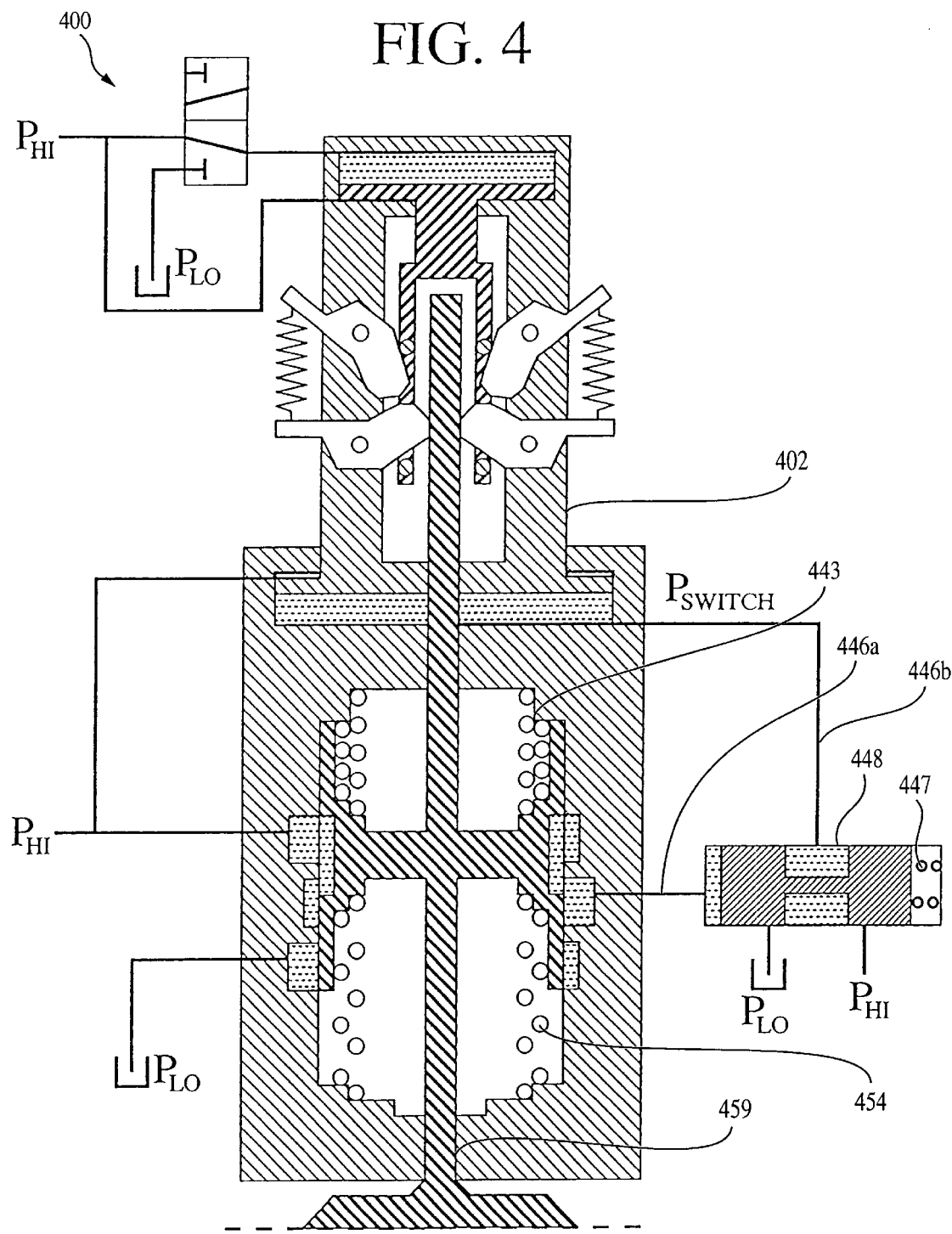
FIG. 4 is a side elevation view of a cross-section of a fourth preferred embodiment of a variable valve timing actuator in accordance with the invention, shown with its poppet valve situated in the seated/closed position.

The orifice 334 is shown in the switching line 346 to indicate that performance may be improved by having the proper flow restriction in that line 346. Ideally, the latching piston assembly 302 will not begin to extend downward until the potential energy in the upper springs 343 has been fully expended (and conversely, the latching piston assembly 302 will ideally not begin to move upward until the potential energy in the lower springs 354 has been fully expended). Once the energy in the springs 343/354 is fully realized in this manner, the latching piston assembly 302 may be activated to further open or close the poppet valve 359 and add make-up energy to the springs 343/354. It is therefore desirable to find a means for timing the motion of the latching piston assembly 302 to perform in the aforementioned manner. The various FIGS. 3(a)–3(d) illustrate a first timing means in the form of the orifice 334 between P_HI and P_SWITCH, with this orifice 334 restricting flow to such an extent that motion of the latching piston assembly 302 is delayed. FIG. 4 illustrates an alternative actuator 400 wherein the timing means is provided in the form of a delay valve 448 which is used to activate the motion of the latching piston assembly 402 at the desired time. Here, the pressure in the switching input line 446a versus the force in the spring 447 will determine whether the pressure in the switching output line 446b is at P_HI or P_LO, and there will be a delay in switching between these pressures. Since the time required for the poppet valve 459 to open or close is virtually independent of the engine speed (depending instead on the energy stored in the spring system 443/454), a fixed time delay (i.e., a mechanical delay valve with no adjustments, such as the one shown) should be adequate.

4. Fifth Embodiment: Implementation of Variable Lift

Figure 5:
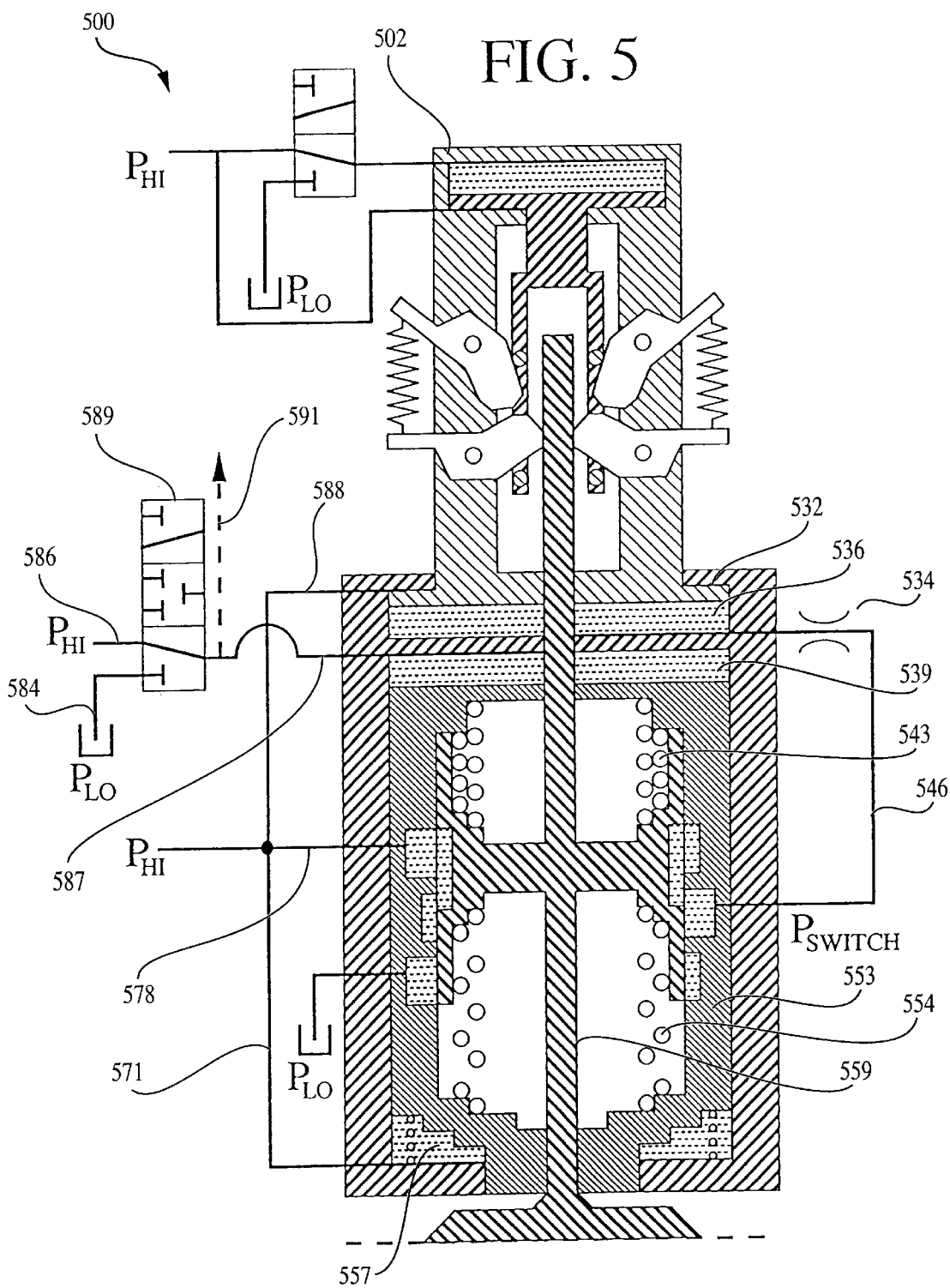
FIG. 5 is a side elevation view of a cross-section of a fifth preferred embodiment of a variable valve timing actuator in accordance with the invention, shown with its poppet valve situated in the seated/closed position.

With reference to FIG. 5, a fifth variable valve timing actuator embodiment is designated generally by the reference numeral 500. The actuator 500, which is in some respects a hybrid of the actuators 200 and 300, provides the poppet valve 559 (illustrated at the fully closed/seated position) with variable lift as well as variable timing. This is done by moving the spring charger assembly 553 upward or downward when the lift of the poppet valve 559 is to be changed. To assist in the reader's understanding, an abbreviated discussion of the structure and operation of the actuator 500 will now be provided.

The variable valve timing actuator 500 has a structure similar to that of the actuator 200 save for several modifications:

First, no bridging passage 237 (as in the actuator 200) is provided between the spring charger assembly extension chamber 539 and the larger latching piston assembly chamber 536.

Second, the switching line 546 is more similar to the switching line 346 illustrated in FIGS. 3(a)–3(d) insofar as it may benefit from the use of an orifice 534 for timing purposes (though other forms of a timing means, e.g., a delay valve, could be used). Note that while the switching line 546 is illustrated leading to the larger latching piston assembly chamber 536 rather than the spring charger assembly extension chamber 539 (as in the actuator 200), this is not in fact a significant functional difference between the actuators 500 and 200. In the actuator 200, owing to the bridging passage 237, the switching line 246 could equally well be connected to the spring charger assembly extension chamber 239.

Third, a lift adjustment line 587 is connected to the spring charger assembly extension chamber 539, and is separated from a high pressure line 586 and a low pressure line 584 by a four-way, three-position valve 589. By adjusting the four-way valve 589, high-pressure fluid can be provided from the high pressure line 586 to the spring charger assembly extension chamber 539, in which case the spring charger assembly 553 will move further downward since the net force on the spring charger assembly 553 is downward. Alternatively, low pressure fluid can be provided from the low pressure line 584 to the spring charger assembly extension chamber 539, in which case the spring charger assembly 553 will move further downward since the net force on the spring charger assembly 553 is down. As a final alternative, the lift adjustment line 587 may be closed, fixing the spring charger assembly 553 in place. Note that while the fluid conduit connections to the smaller latching piston assembly chambers 532 and 232 may appear to be different insofar as the high pressure line 288 is shown as being an independent line with pressure P_HI and the high pressure line 588 is connected to lines 571 and 578, in reality, either arrangement may be used since the two are functionally equivalent (i.e., both supply fluid at P_HI to the smaller latching piston assembly chamber 532).

Owing to the foregoing arrangement, the actuator 500 works similarly to the actuator 200, but appropriate adjustment of the valve 589 repositions the spring charger assembly 553 and thereby changes the lift of the poppet valve 559. Functionally, the actuator 500 might be said to be more similar to the actuator 300: in the actuator 200, the spring charger assembly 253 is primarily used to add energy to the springs 243/254 whereas the latching piston 202 is primarily used to add lift to the poppet valve 259; in the actuators 300 and 500, the latching pistons 302/502 are primarily used to add energy to the springs 343/354 and 543/554 (with the spring charger assembly 553 primarily being used to add lift to the poppet valve 559 in the actuator 500).

It is contemplated that in multi-poppet valve 559 versions of this actuator 500, the lift of all poppet valves 559 would probably be changed together so that all poppet valves 559 in the engine would have the same lift (or perhaps that all intake valves would have the same lift, and all exhaust valves would similarly have the same lift, which could be different from that of the intake valves). To increase the lift of a set of poppet valves 559, hydraulic fluid could be metered by a single valve 589 into the spring charger assembly extension chambers 539 at the tops of all spring charger assemblys 553 to move them downward. This can be done by connecting the lift adjustment lines 587 of other actuators 500 by a connection line such as line 591. Once the proper amount of hydraulic fluid has been introduced to achieve the desired lift, the valve 589 connected to these chambers 539 would be closed to trap the hydraulic fluid in place. The springs 556 illustrated in the spring charger assembly retraction chambers 557 at the bottoms of the spring charger assemblys 553 are included to better ensure that equal amounts of hydraulic fluid are introduced into each retraction chamber 557 beneath the spring charger assemblys 553, so that all spring charger assemblys 553 are in equilibrium at the same relative positions (with the trapped hydraulic fluid in the chambers above the spring charger assemblys 553 being at the same pressure, since they are interconnected).

5. Other Variations of the Invention

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, the foregoing structures were described as using hydraulic actuation. Hydraulic actuation, wherein the acting fluid is incompressible, is greatly preferred over pneumatic actuation, wherein the acting fluid is compressible. A compressible acting fluid might allow for undesired displacement of components and/or additional thermodynamic losses. However, pneumatic actuation is an available option, and might under some circumstances be preferable to hydraulic actuation.

Second, rather than using hydraulics to actuate the various components, it might be possible to alternatively (or additionally) utilize electromechanical actuators such as piezoelectric actuators or magnetorestrictive actuators. As an example, regarding piezoelectric actuators, the chambers for the hydraulic fluid might be occupied by piezoelectric materials which expand when charged and thereby move the spring charger assembly, etc. in question. Similarly, the valves illustrated throughout the various embodiments could be piezoelectrically actuated.

Figure 6:
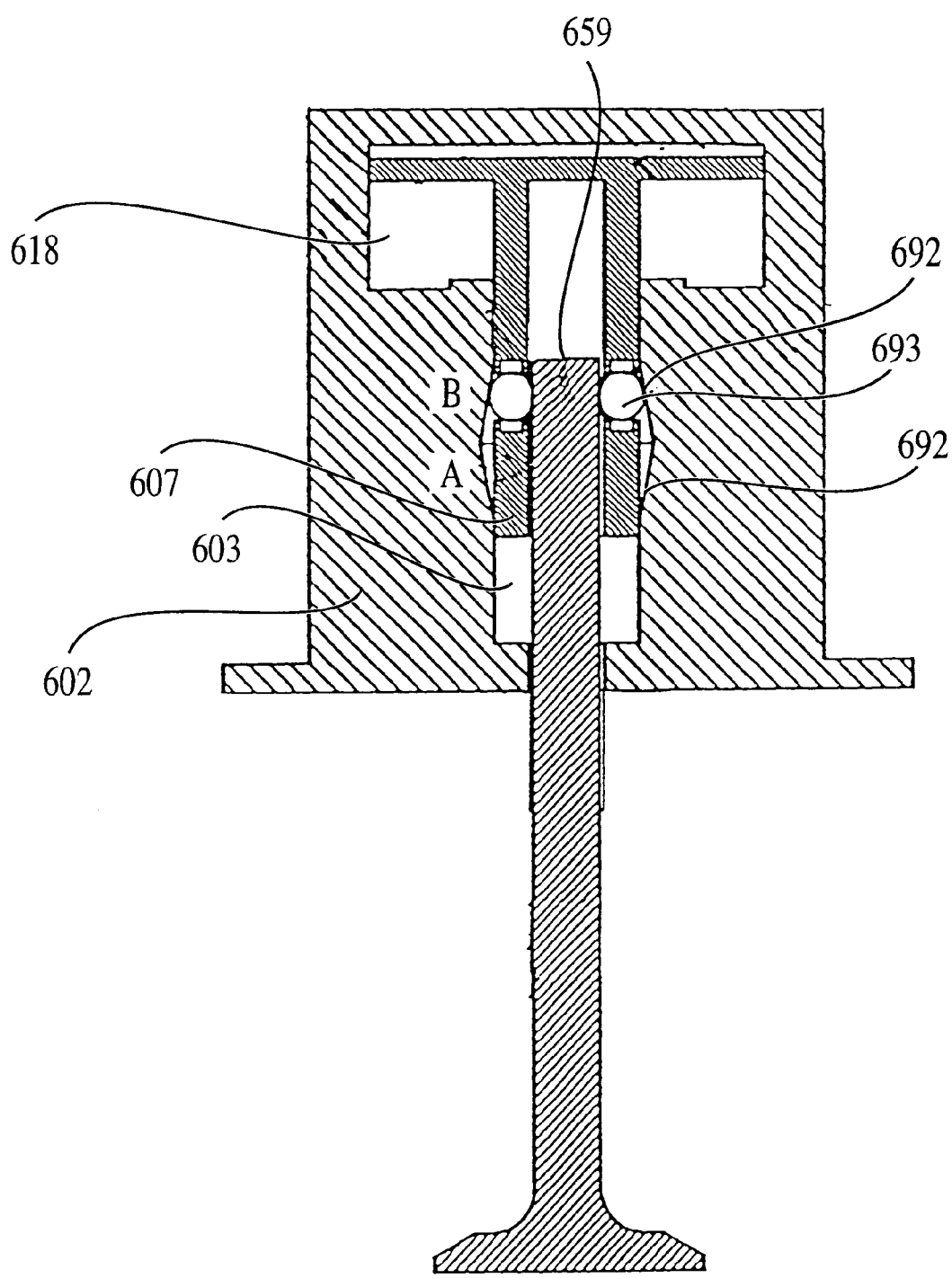
FIG. 6 is a side elevation view of a cross-section of an alternative latching piston assembly suitable for use in the actuators 200, 300, 400 and 500 of FIGS. 2(a)–5.

Third, a wide variety of mechanical latches may be used in place of the aforementioned sprags, e.g., locking plates, roller clutches, etc. An example is illustrated in FIG. 6, wherein an alternative version of a latching piston assembly 602 suitable for replacing latching pistons 202, 302, 402, and 502 is illustrated. Within the latching piston assembly 602, a latching piston output chamber 603 and a latching piston input chamber 618 are provided wherein a latching piston 607 reciprocates. The poppet valve 659 moves within the latching piston output chamber 603, wherein latching members 693 riding within the latching piston 607 may be forced by ramps 692 on the latching piston assembly 602 against the poppet valve 659, thereby securing it against motion. The latching members 693, which are preferably provided in the form of rollers or bearings so that they may more freely move against the valve 659 and ramps 692, are actuated by the latching piston 607. The latching piston 607 is positioned by fluid pressure within the latching piston input chamber 618 to move within the latching piston output chamber 603 of the latching piston assembly 602. If the latching members 693 are pushed against the ramps B by the latching piston 607, motion of the poppet valve 659 is allowed in the opening direction (downward in FIG. 6), but prevented in the closing direction (upward in FIG. 6). If the latching members 693 are pushed against ramps A, the opposite is true.

It is noted that the angles of the ramps 692 shown in FIG. 6 are a key parameter in determining how well the latching works. A smaller angle (shallower ramps 692) is able to latch rollers 693 with lower coefficients of friction, but requires a higher travel distance for the latching piston 607 or tighter tolerances on the ramps 692, both of which are undesirable. It is suggested that a ramp angle of around 5 degrees is a reasonable starting point for testing and refinement purposes of particular embodiments undergoing prototyping.

Some compliance between the latching members 693 and the latching piston 607 may be desired. This will account for the difference between the distance the latching piston 607 travels and the actual distance required to engage the latching members 693. This compliance could come from a rubber washer, leaf spring, or similar compressible carriage for the latching members 693 within the latching piston 607.

Hydraulically or pneumatically actuated latches may also be used, as well as latches that are enabled by electromagnetic forces are also possible. However, further work is required to reduce the losses of electromagnetic latches (e.g., solenoids) to an acceptable level.

Fourth, in the drawings, various embodiments are illustrated using both single springs and sets of multiple concentric springs. It should be understood that any number of springs may be used, and that they need not necessarily be helical springs. This includes the use of elastomeric members, air springs, pneumatic accumulators, and other compressible structures that allow the storage of potential energy, though helical springs are preferred for their cost, simplicity, and ready availability.

Fifth, it is possible to utilize a wide variety of valving arrangements apart from those shown. As an example, the four-way valve system for actuating the hydraulic pistons, assemblies, etc. of actuator 500 could replace the three-way valve system of actuators 100, 200, 300, and 400. Additionally, a wide variety of different valves may be used apart from spool valves.

Sixth, in the foregoing discussion, it was noted that addition of make-up potential energy is preferably done when the poppet valve is at its fully open and/or fully closed positions (or both). It is possible to add make up energy at other times, though this will generally be less efficient. If it is assumed that make-up energy will be added to the system by means of a hydraulic piston that will add potential energy to the springs, hydraulic losses will depend upon the flow rate required, with a lower flow rate resulting in lower losses. Therefore, energy is preferably added to the spring/poppet valve system when the distance required is a minimum, and the time available to accomplish this is a maximum. If energy is viewed as the product (Force)*(Distance), the distance required to add the same amount of energy is smallest when the force being used is greatest. This occurs at the extents of poppet valve travel, when the resultant spring force to be overcome is largest. Therefore, for the sake of efficiency, it is recommended that the make-up energy be added when the valve is near either its fully closed or its fully open position (or both).

Seventh, in the foregoing discussion, it was noted that regeneration is preferably provided by potential energy storage devices such as springs. It should be understood that the potential energy storage devices suitable for use in the invention are not limited to the "classical" (helical) springs illustrated in the drawings, and a wide variety of other forms of potential energy storage devices are possible, such as elastomeric springs (i.e., elastomeric members) and pneumatic springs (i.e., pneumatic cylinders, chambers, bladders, or other forms of pneumatic accumulators).

It should also be understood that various terms referring to orientation and position are used throughout this document—e.g., "top" (as in "larger top spring charger assembly face"), "bottom" (as in "smaller bottom spring charger assembly face"), and "upward", "downward", "extended", and "retracted" (as used to describe the directions of motion of the various components)—are relative terms rather than absolute ones. In other words, it should be understood (for example) that the bottom smaller spring charger assembly face being referred to may in fact be located at the top of the apparatus depending on the overall orientation of the apparatus; similarly, whether a component is regarded as being extended or retracted depends on the datum set for the component. Thus, such terms should be regarded as illustrative terms, rather than limiting terms.

The invention is not intended to be limited to the preferred embodiments described above, but rather is intended to be limited only by the claims set out below. Thus, the invention will encompass all alternate embodiments that fall literally or equivalently within the scope of these claims.

What is claimed is:

1. A valve actuator comprising:
    a. a valve including a valve head and a valve stem, the valve being movable within a valve housing:
       (1) along a valve motion axis situated along the valve stem, and
       (2) between two opposing extreme valve positions;
    b. a spring charger assembly movable with respect to the valve housing;
    c. at least one spring, each spring being situated between the valve and the spring charger assembly, wherein the motion of the spring charger assembly causes the spring to urge the valve along the valve motion axis;
    d. at least one latch, each latch being actuatable to selectively restrain the valve from motion in one direction along the valve motion axis toward one extreme valve position, and allow motion in the opposite direction along the valve motion axis toward the opposite extreme valve position;
    wherein after the valve is at least substantially moved toward the one extreme valve position, the spring charger assembly is moved toward the opposite extreme valve position, thereby acting on the spring to urge the valve toward the opposite extreme valve position.

2. The valve actuator of claim 1 wherein, after the valve is at least substantially moved toward the one extreme valve position:
    a. the latch is actuated to allow the valve to move along the valve motion axis to the opposite extreme valve position, and
    b. the spring charger assembly is moved toward the opposite extreme valve position, thereby acting on the spring,
    whereby the spring urges the valve to the opposite extreme valve position.

3. The valve actuator of claim 1 wherein at least two latches are provided, these latches including:
    a. a first latch selectively restraining the valve from motion along the valve motion axis toward the one extreme valve position; and
    b. a second latch selectively restraining the valve from motion along the valve motion axis toward the opposite extreme valve position.

4. The valve actuator of claim 1 wherein the latch is actuated by a piston to selectively restrain the valve, the piston in turn being actuated by fluid pressure in an adjacent piston input chamber.

5. The valve actuator of claim 1 wherein the latch is a sprag which pivots to engage the valve.

6. The valve actuator of claim 1 wherein the latch includes a latching member which travels along the valve motion axis between the valve and a ramp, whereby the member may be forced by the ramp against the valve to thereby engage it.

7. The valve actuator of claim 1 wherein the spring charger assembly is actuated to move with respect to the valve housing by fluid pressure in an adjacent spring charger assembly chamber.

8. The valve actuator of claim 7 wherein motion of the valve stem selectively ports fluid to the spring charger assembly chamber, thereby altering the fluid pressure therein.

9. The valve actuator of claim 8 wherein:
    a. the valve stem has a valve switching cavity therein,
    b. the spring charger assembly has:
       (1) at least one spring charger assembly switching cavity defined therein, each spring charger assembly switching cavity being in fluid communication with a pressurized fluid supply, and
       (2) a bridge cavity defined therein, the bridge cavity being in fluid communication with the spring charger assembly chamber,
    wherein motion of the valve stem may selectively cause the valve switching cavity to connect the spring charger assembly switching cavity and the bridge cavity, thereby porting fluid from the spring charger assembly switching cavity to the spring charger assembly chamber.

10. The valve actuator of claim 9 wherein the spring charger assembly has two spring charger assembly switching cavities defined therein:
    a. a high pressure spring charger assembly switching cavity, and
    b. a low pressure spring charger assembly switching cavity,
    the low pressure spring charger assembly switching cavity having a fluid supply at lower pressure than the fluid supply of the high pressure spring charger assembly switching cavity.

11. The valve actuator of claim 1 further comprising a latching assembly wherein the latch is situated, the latching assembly being movable with respect to the valve.

12. The valve actuator of claim 11 wherein after the valve is moved at least substantially toward the one extreme valve position:
    a. the latching assembly is moved toward the one extreme valve position, whereby the latches further urge the valve toward the one extreme valve position, and subsequently:

b. the spring charger assembly is moved toward the opposing extreme valve position, whereby the spring urges the valve toward the opposite extreme valve position.

13. The valve actuator of claim 11 wherein the latching assembly is actuated to move with respect to the valve housing by fluid pressure in an adjacent latching assembly chamber.

14. The valve actuator of claim 13 wherein the spring charger assembly is actuated to move with respect to the valve housing by fluid pressure in an adjacent spring charger assembly chamber, and wherein the latching assembly chamber is in fluid communication with the spring charger assembly chamber.

15. A valve actuator comprising:
  a. a valve housing;
  b. a valve including a valve head and a valve stem, the valve being movable within the valve housing:
    (1) along a valve motion axis situated along the valve stem, and
    (2) between two extreme opposing valve positions;
  c. at least one spring, each spring acting against the valve whereby the valve may be urged by the spring along the valve motion axis;
  d. one or more latches, each latch being actuatable to selectively restrain the valve from motion in one direction along the valve motion axis, and allow motion in the opposite direction along the valve motion axis;
  e. a latching assembly wherein the latches are situated, the latching assembly being movable with respect to the valve in a direction parallel to the valve motion axis;
wherein after the spring urges the valve at least substantially toward one extreme valve position, the latching assembly is moved toward that position, whereby the latches further urge the valve toward that position.

16. The valve actuator of claim 15 wherein the latching assembly is actuated to move with respect to the valve by fluid pressure in an adjacent latching assembly chamber.

17. The valve actuator of claim 16 wherein motion of the valve stem selectively ports fluid to the latching assembly chamber.

18. The valve actuator of claim 17 wherein:
  a. the valve stem has a valve switching cavity therein,
  b. the valve housing has:
    (1) at least one housing switching cavity defined therein, each housing switching cavity being connected to a pressurized fluid supply, and
    (2) a bridge cavity defined therein, the bridge cavity being in fluid communication with the latching assembly chamber,
wherein motion of the valve stem may selectively cause the valve switching cavity to connect the housing switching cavity and the bridge cavity, thereby porting fluid from the housing switching cavity to the latching assembly chamber.

19. The valve actuator of claim 15 further comprising a spring charger assembly movable with respect to the valve, wherein each spring is situated between the valve and the spring charger assembly.

20. The valve actuator of claim 19 wherein after the valve is at least substantially moved toward the one extreme valve position, the spring charger assembly is moved toward an opposing extreme valve position to thereby act on the spring, whereby the spring urges the valve toward the opposing extreme valve position.

21. A valve actuator comprising:
  a. a valve including a valve head and a valve stem, the valve being movable within a valve housing:
    (1) along a valve motion axis situated along the valve stem, and
    (2) between opposing first and second extreme valve positions;
  b. a spring charger assembly movable with respect to the valve;
  c. one or more springs, each spring being situated between the valve and the spring charger assembly, wherein the valve may be urged by the spring along the valve motion axis;
  d. one or more latches, each latch being actuatable to selectively restrain the valve from motion in one direction along the valve motion axis and allow motion in the opposite direction along the valve motion axis;
  e. a latching assembly wherein the latches are situated, the latching assembly being movable with respect to the valve in a direction parallel to the valve motion axis;
wherein after the valve is moved at least substantially toward a first extreme valve position:
  (1) the latching assembly is moved toward the first extreme valve position, whereby the latches further urge the valve toward the first extreme valve position, and
  (2) the spring charger assembly is subsequently moved toward the second extreme valve position, thereby urging the valve toward the second extreme valve position.

* * * * *